(12) United States Patent
Ly et al.

(10) Patent No.: US 11,826,970 B2
(45) Date of Patent: Nov. 28, 2023

(54) FORMING APPARATUS, METHOD, AND SYSTEM

(71) Applicant: The Boeing Company, Chicago, IL (US)

(72) Inventors: Long Ly, Renton, WA (US); Chace Wilcoxson, Kent, WA (US); Darrell Jones, Mill Creek, WA (US); Kurtis Willden, Kent, WA (US); Michael A. Lee, Kent, WA (US); Jonathan Santiago, Seattle, WA (US); Josiah Brubaker, Bellingham, WA (US); Michael Karas, Bainbridge Island, WA (US); Joseph Warren, Maple Valley, WA (US)

(73) Assignee: The Boeing Company, Arlington, VA (US)

( * ) Notice: Subject to any disclaimer, the term of this patent is extended or adjusted under 35 U.S.C. 154(b) by 51 days.

(21) Appl. No.: 17/505,918

(22) Filed: Oct. 20, 2021

(65) Prior Publication Data

US 2022/0176655 A1 Jun. 9, 2022

Related U.S. Application Data

(60) Provisional application No. 63/199,087, filed on Dec. 7, 2020.

(51) Int. Cl.
*B29C 70/44* (2006.01)
*B29C 70/30* (2006.01)
(Continued)

(52) U.S. Cl.
CPC .............. *B29C 70/44* (2013.01); *B29C 51/08* (2013.01); *B29C 70/30* (2013.01); *B29L 2031/3076* (2013.01)

(58) Field of Classification Search
CPC ......... B29C 70/30; B29C 70/38; B29C 70/44; B29C 70/541; B29C 70/543; B29C 70/56
See application file for complete search history.

(56) References Cited

U.S. PATENT DOCUMENTS 4,208,238 A * 6/1980 August .................. B66C 19/00
156/523
4,648,934 A 3/1987 Kiss
(Continued)

FOREIGN PATENT DOCUMENTS

EP 3 067 187 9/2016

OTHER PUBLICATIONS

Solvay: P720X Release film (Mar. 21, 2013).
European Patent Office, Partial European Search Report, App. No. 21208503.9 (dated May 13, 2022).

*Primary Examiner* — Robert B Davis
(74) *Attorney, Agent, or Firm* — Walters & Wasylyna LLC

(57) ABSTRACT

A forming apparatus includes a frame. The frame defines a vertical axis, a horizontal axis, and a longitudinal axis. A carriage is movably connected to the frame. A stomp foot is movably connected to the carriage such that it may move along the vertical axis. A first end effector is movably connected to the carriage and a second end effector movably connected to the carriage. The first end effector and second end effector are laterally opposed to each other along the longitudinal axis and the stomp foot is located between the first end effector and the second end effector.

20 Claims, 24 Drawing Sheets

(51) Int. Cl.
*B29C 51/08* (2006.01)
*B29L 31/30* (2006.01)

(56) References Cited

U.S. PATENT DOCUMENTS

| | | |
|---|---|---|
| 6,814,916 B2 | 11/2004 | Willden et al. |
| 7,118,370 B2 | 10/2006 | Willden et al. |
| 7,137,182 B2 | 11/2006 | Nelson |
| 7,651,650 B2 | 1/2010 | Willden et al. |
| 8,142,181 B2 | 3/2012 | Willden et al. |
| 8,236,222 B2 | 8/2012 | Henderson et al. |
| 8,336,596 B2 | 12/2012 | Nelson et al. |
| 8,578,995 B2 | 11/2013 | Nelson |
| 8,808,490 B2 | 8/2014 | Hagman et al. |
| 9,656,829 B2 | 5/2017 | Hagman et al. |
| 9,663,247 B2 | 5/2017 | Rotter et al. |
| 10,011,080 B2 * | 7/2018 | Studley ................... B29C 70/38 |
| 10,086,596 B2 | 10/2018 | Desjardien et al. |
| 10,456,960 B2 | 10/2019 | Chapman et al. |
| 10,688,697 B2 | 6/2020 | Sundquist et al. |
| 10,717,225 B2 | 7/2020 | Stone |
| 2016/0263879 A1 * | 9/2016 | Desjardien ............... B32B 41/00 |
| 2016/0368226 A1 | 12/2016 | Encinosa et al. |
| 2017/0239896 A1 * | 8/2017 | Stawski ................... B29C 33/60 |
| 2020/0016797 A1 | 1/2020 | Chapman et al. |
| 2020/0282666 A1 | 9/2020 | Lathrop et al. |

* cited by examiner

FORMING APPARATUS, METHOD, AND SYSTEM

PRIORITY

This application claims priority from U.S. Ser. No. 63/199,087 filed on Dec. 7, 2020.

FIELD

The present application relates to manufacturing of composite parts, and is particularly directed to an apparatus, method, and system of ply by ply forming of composite parts.

BACKGROUND

Formed composite structures are commonly used in applications where light weight and high strength are desired, such as in aircraft and vehicles. Often, these applications utilize contoured parts that must be formed and then cured. Conventional formation of composite structures, particularly relatively large composite structures or composite structures having a complex contour, requires extensive manual labor prior to curing. For example, composite fiber plies (e.g., pre-impregnated fiber plies or dry fabric) are laid by hand over a shaped forming tool or mandrel. The part is then cured, often by heating and pressure. The resulting part matches the shape of the forming tool. However, manual layup of the fiber plies is time consuming and laborious.

Some known composite manufacturing processes attempt to automate a portion of the formation operation. As an example, a drape forming process includes heating a laminate stack of pre-impregnated fiber plies ("composite charge") and forcing it around a mandrel with the use of a vacuum bag or rubber bladder. However, this method has achieved limited success on thick laminates or structures with more complex shapes. As another example, a compactor may be used to compress the composite charge against a tool surface during fabrication. However, this method often requires supplemental manual formation after compaction when the tool surface and resulting structure is contoured. Accordingly, while such methods may be effective at forming relatively small and thin composite structures or composite structures with relatively simple shapes, they may be inefficient when applied to forming large composite structures or composite structures with more complex shapes.

Accordingly, those skilled in the art continue with research and development efforts in the field of composite manufacturing and, more particularly, to the ply by ply manufacture of relatively large and/or relatively complex composite structures.

SUMMARY

Disclosed are a forming apparatus, methods, and systems.

In one example, the disclosed forming apparatus includes a frame. The frame defines a vertical axis, a horizontal axis, and a longitudinal axis. A carriage is movably connected to the frame. A stomp foot is movably connected to the carriage such that it may move along the vertical axis. A first end effector is movably connected to the carriage and a second end effector movably connected to the carriage. The first end effector and second end effector are laterally opposed to each other along the longitudinal axis and the stomp foot is located between the first end effector and the second end effector.

Also disclosed is a method for forming a composite part.

In one example, the disclosed method for forming a composite part includes applying at least one ply of composite material over a forming surface of a forming tool. The method further includes deforming the at least one ply of composite material over the forming surface of the forming tool with a forming apparatus. The forming apparatus includes a frame. The frame defines a vertical axis, a horizontal axis, and a longitudinal axis. A carriage is movably connected to the frame. A stomp foot is movably connected to the carriage such that it may move along the vertical axis. A first end effector is movably connected to the carriage and a second end effector movably connected to the carriage. The first end effector and second end effector are laterally opposed to each other along the longitudinal axis and the stomp foot is located between the first end effector and the second end effector.

Also disclosed is a system for forming a composite part.

In one example, the disclosed system includes a forming apparatus. The forming apparatus includes a frame. The frame defines a vertical axis, a horizontal axis, and a longitudinal axis. A carriage is movably connected to the frame. A stomp foot is movably connected to the carriage such that it may move along the vertical axis. A first end effector is movably connected to the carriage and a second end effector movably connected to the carriage. The first end effector and second end effector are laterally opposed to each other along the longitudinal axis and the stomp foot is located between the first end effector and the second end effector. The system further includes a forming tool. The system further includes at least one ply of composite material. The system further includes a ply support feature located below the stomp foot.

BRIEF DESCRIPTION OF THE DRAWINGS

FIG. 17b is an isometric view of the portion of the forming apparatus of FIG. 17a.

DETAILED DESCRIPTION

Figure 1:
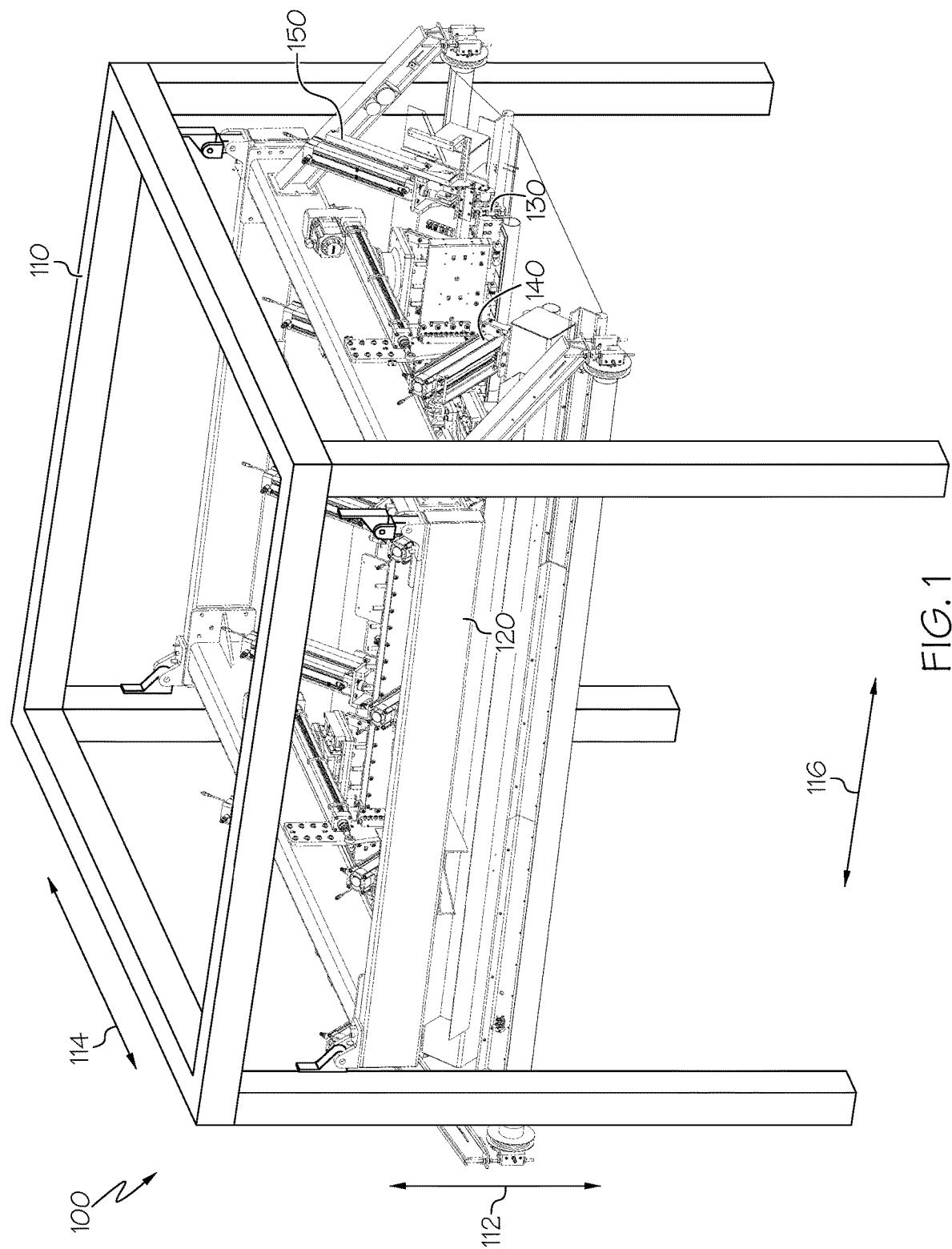
FIG. 1 is a perspective drawing of an example forming apparatus.

The present application is directed to an apparatus, method, and system of ply by ply forming of composite parts. It is to be understood that the disclosure below provides a number of embodiments or examples for implementing different features of various embodiments. Specific examples of components and arrangements are described to simplify the present disclosure. Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

Examples of the forming apparatus 100, method 200, and system 300 enable automated forming of a composite part 375 and, more particularly, formation of at least one ply 320 of composite material 325 over a forming tool 310 for manufacture of the composite part 375. Automation of the fabrication process provides a reduction in processing time, a reduction in labor and costs and a reduction of process variations (e.g., human error) that may lead to undesired inconsistencies in the finished composite structure as compared to conventional composite fabrication. The forming apparatus 100, method 200, and system 300 also enable ply-by-ply formation of the composite material 325 to fabricate the composite part 375. Ply-by-ply formation facilitates fabrication of large composite structures, thick composite structures and/or composite structures with complex shapes. Ply-by-ply formation also provides a reduction in buckling or wrinkling of plies within the composite structure as compared to conventional composite fabrication.

Generally, a composite ply includes a single ply (e.g., one layer of thickness) of composite material 325. The composite material 325 may take the form of any one of various suitable types of composite material 325. In one or more examples, the ply 320 of composite material 325 is formed by laminating multiple courses of unidirectional composite tape, which is pre-impregnated with a resin matrix. Throughout the present disclosure, the phrase "the ply" refers to at least one ply 320 of composite material 325, unless explicitly stated otherwise. The ply 320 may also be referred to as a composite patch or a composite charge.

Figure 18:
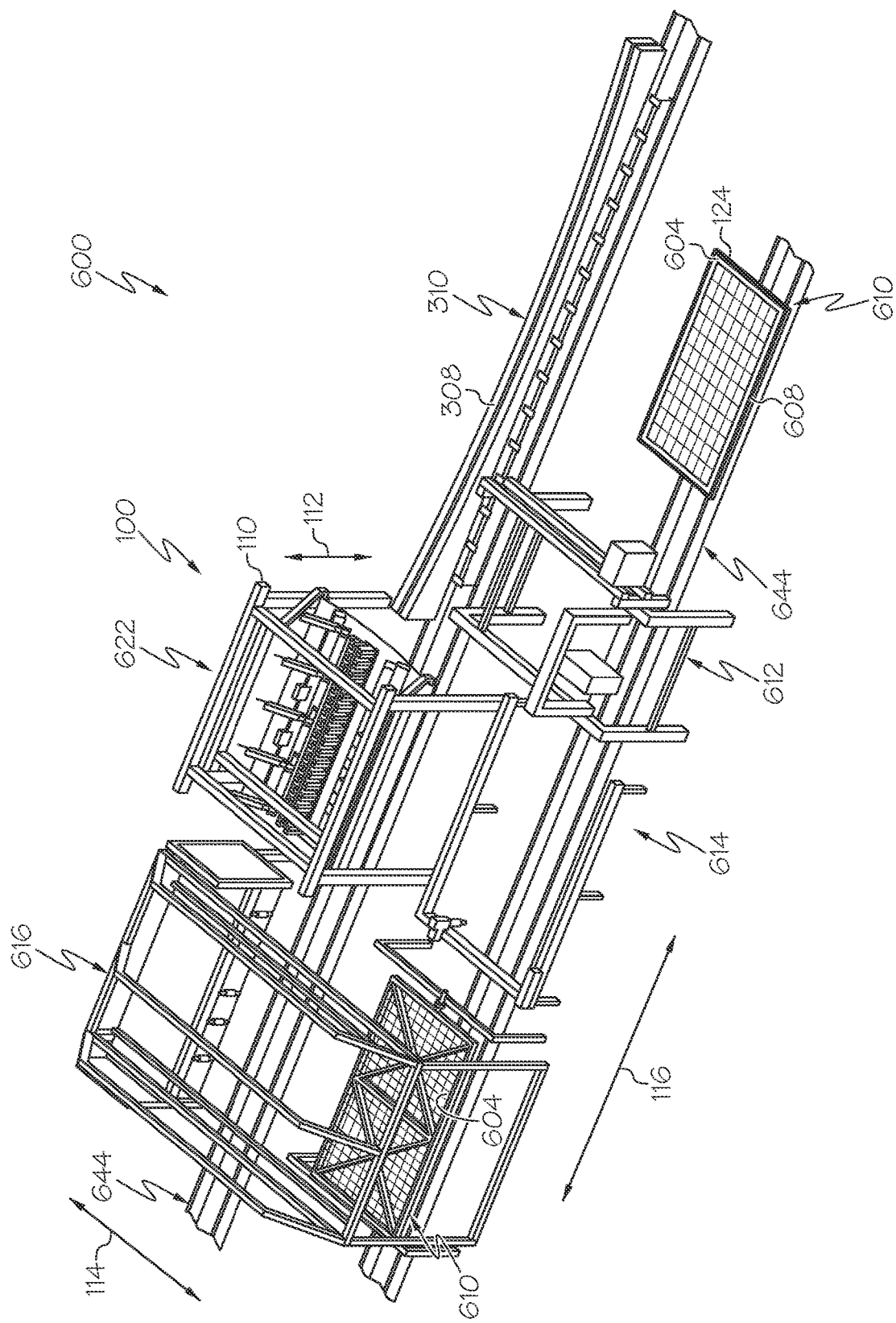
FIG. 18 is a perspective view of a composite manufacturing system.

As illustrated in FIG. 18, a composite manufacturing system 600 includes a plurality of sub-systems, including a forming system 622, that facilitate and correspond to different fabrication operations associated with the manufacture of the composite part 375. The sub-systems of the composite manufacturing system 600 are interlinked and cooperate to automate at least a portion of the fabrication process. Throughout the present disclosure, the sub-systems of the disclosed composite manufacturing system 600 may be referred to as "systems" themselves or stations in which one or more fabrication operations occur. Among those sub-systems or stations is a system 300 for forming, which is shown and described in detail below.

The examples of the forming apparatus 100 (FIG. 1), method 200 (FIG. 19), and system 300 (FIG. 22) described herein utilize a plurality of semi-automated or automated sub-systems to perform ply-by-ply formation and compaction of an individual one or more ply 320 of composite material 325 on the forming tool 310. Ply-by-ply formation refers to the laydown of one or more ply 320 of composite material 325 on the forming tool 310 in a predetermined sequence, and the one or more ply 320 of composite material 325 is compacted onto the forming tool 310 individually after each ply 320 of composite material 325 is laid down, or after more than one ply 320 of composite material 325 had been laid down.

Disclosed is a forming apparatus 100, a method 200, and a system 300 directed to ply by ply forming of a composite part 375 to apply pressure and manipulate plies on a forming tool 310. The forming apparatus 100, method 200, and system 300 utilize a forming tool 310 to define the shape of the composite part 375. The forming tool 310 may be any desired shape including a hat stringer forming tool 312, a spar forming tool 314, and a stringer forming tool 316. The forming apparatus 100 is configured to apply pressure or compaction force 350 evenly across at least one ply 320 of composite material 325 over a forming surface 308 of a forming tool 310. The forming apparatus 100 is further configured to deform 220 the at least one ply 320 of composite material 325 over the forming surface 308 of the forming tool 310 while eliminating any bubbles. The forming apparatus 100 is configured to move along the forming tool 310 at varying speeds, pressures, and angles to accommodate various geometries.

Figure 2:
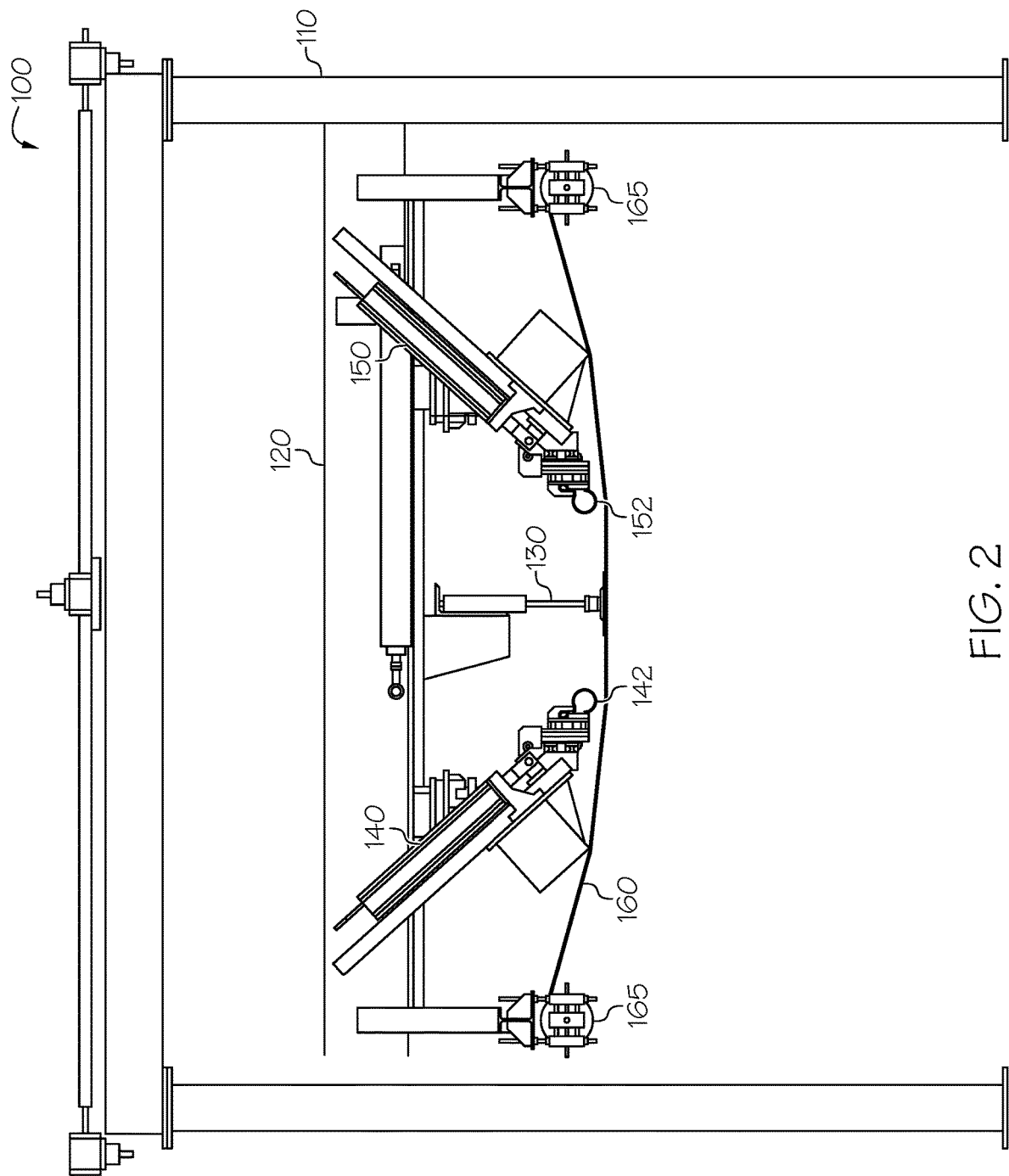
FIG. 2 is a side view of the example forming apparatus of FIG. 1.

Referring to FIG. 1 and FIG. 2, an example of a forming apparatus 100 is illustrated. In an example, the forming apparatus 100 includes a frame 110. In an example, the frame 110 is generally rectangular in shape. The frame 110 defines a vertical axis 112, a horizontal axis 114, and a longitudinal axis 116. The frame 110 surrounds a carriage 120 having a shape that is generally the same as the frame 110 but is smaller such that the carriage 120 nests within the frame 110. In an example, the carriage 120 is movably connected to the frame 110 such that it may pivot or rotate along the vertical axis 112 and horizontal axis 114 to accommodate any specific geometry or configuration and achieve a best fit position.

In an example, the forming apparatus 100 includes a first end effector 140. The first end effector 140 is movably connected to the carriage 120. In an example, the first end effector 140 is movable via an actuator 147. In an example, the actuator 147 is a pneumatically actuated forming cylinder 147a. The first end effector 140 may include one or more sensor 410 configured to detect the location of a forming tool 310 along multiple axes including a vertical axis 112, horizontal axis 114, and longitudinal axis 116 for precise forming on a complex forming tool 310. The one or more sensor 410 may be in communication with a controller 400, FIG. 22. The controller 400 is configured to receive data from the one or more sensor 410 and analyze that data to control movement of the first end effector 140. The controller 400 may utilize one or more numerical control program 420 in conjunction with the data collected from the one or more sensor 410 to determine proper movement and placement of the first end effector 140.

Figure 3:
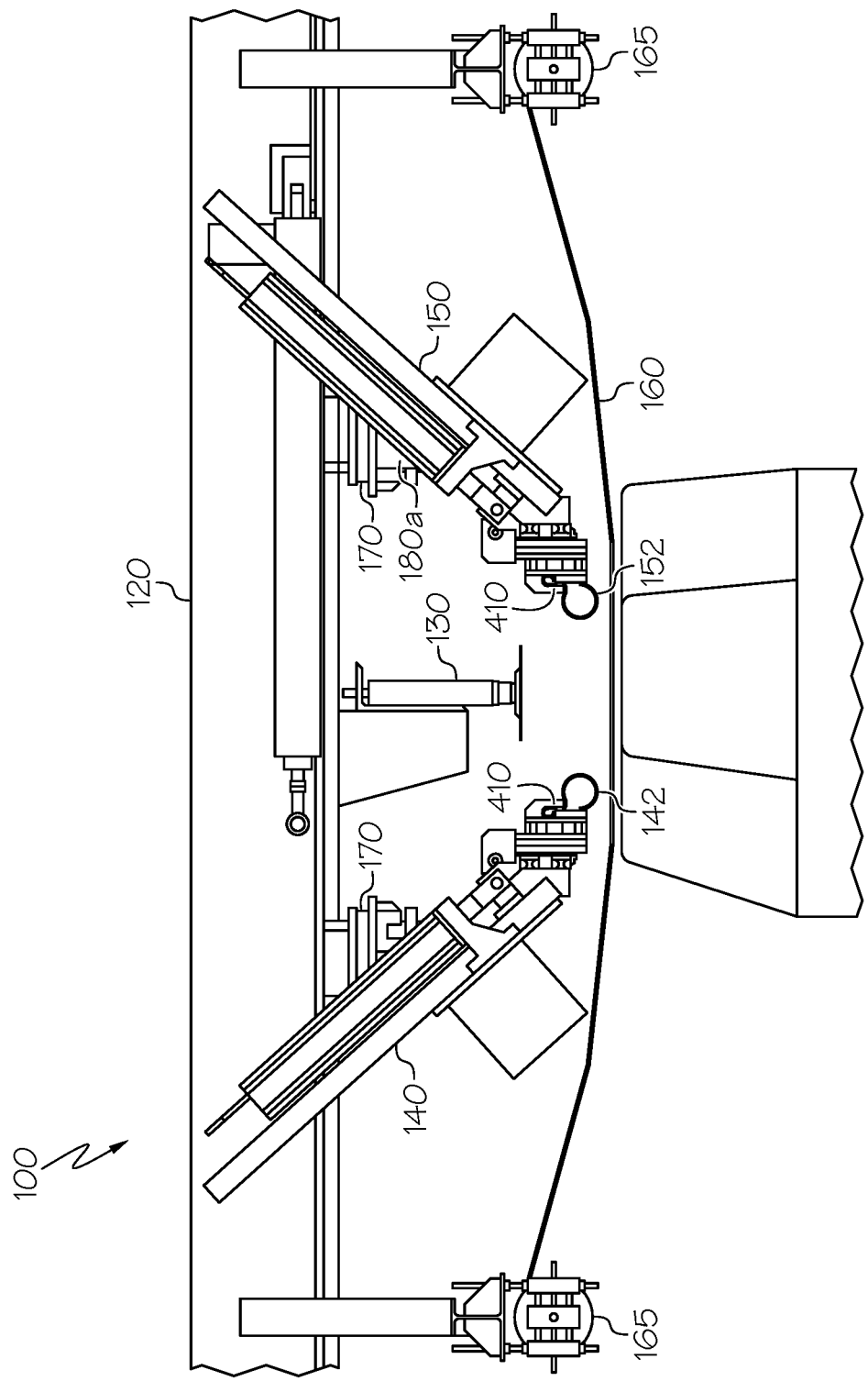
FIG. 3 is a side view of the example forming apparatus of FIG. 1.
Figure 17A:
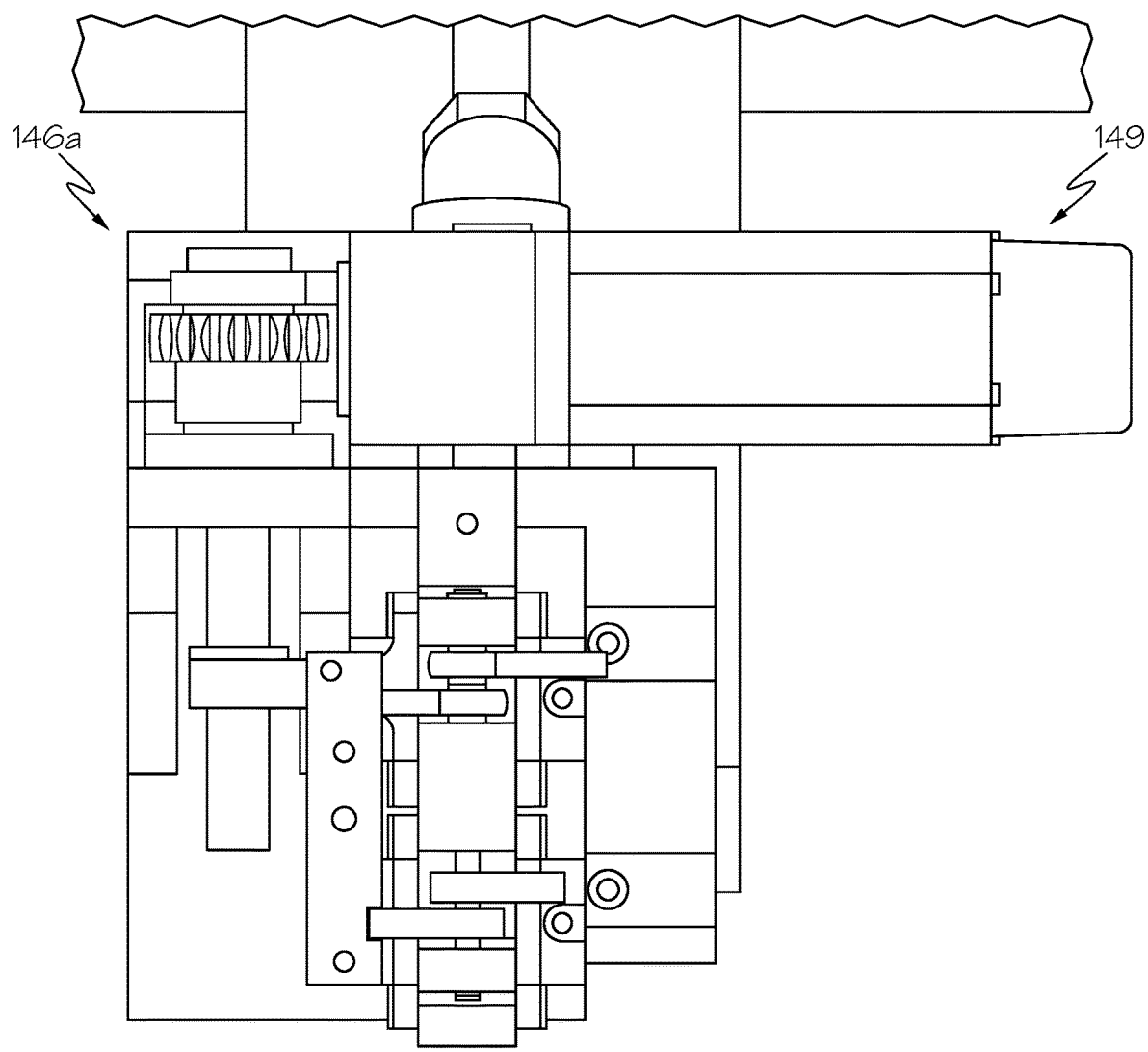
FIG. 17a is a side view of a portion of the forming apparatus of FIG. 1
Figure 17B:
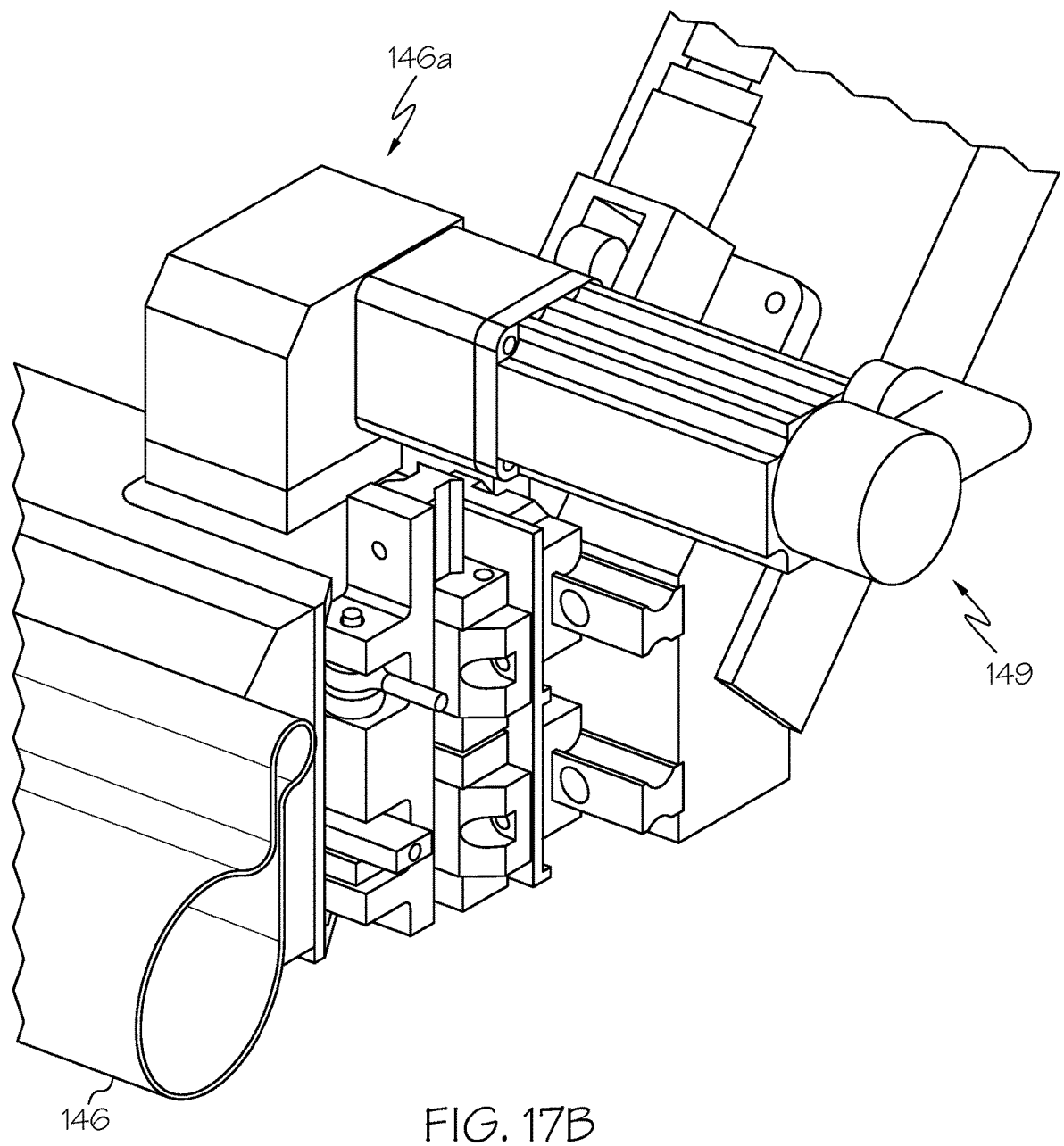

Referring to FIG. 3, the first end effector 140 includes a first forming feature 142. In an example, the first forming feature 142 is a forming finger 148. In an example, first forming feature 142 is an inflatable bladder 146. The inflatable bladder 146 is configured to passively follow forming tool 310 contours by consistently applying compaction force 350. Compaction force 350 may vary. In an example, compaction force 350 may be up to 20 lbs per linear inch. The inflatable bladder 146 profile or orientation may be manipulated with one or more jacking screw 146a to conform to concave or convex profiles along the forming tool 310 length and to control the radius of the inflatable bladder 146, see FIGS. 16a to 16d. FIG. 17a and FIG. 17b illustrate jacking screw 146a with respect to the inflatable bladder 146.

In an example, the forming apparatus 100 includes a second end effector 150. The second end effector 150 is movably connected to the carriage 120. In an example, the first end effector 140 is laterally opposed from the second end effector 150 relative to the longitudinal axis 116. The first end effector 140 and the second end effector 150 are configured to move independently from each other. In an example, the first end effector 140 and the second end effector 150 are configured to independently move laterally relative to the longitudinal axis 116.

In an example, the second end effector 150 is movable via an actuator 147. In an example, the actuator 147 is a pneumatically actuated forming cylinder 147a. The second end effector 150 may include one or more sensor 410 configured to detect the location and configuration of a forming tool 310. The one or more sensor 410 may be in communication with a controller 400. The controller 400 is configured to receive data from the one or more sensor 410 and analyze that data to control movement of the second end effector 150. The controller may utilize one or more numerical control program 420 in conjunction with the data collected from the one or more sensor 410 to determine proper movement and placement of the second end effector 150. The second end effector includes a second forming feature 152. In an example, the second forming feature 152 is a forming finger 148. In an example, second forming feature 152 is an inflatable bladder 146.

In an example, the forming apparatus 100 incudes a stomp foot 130 that is movably connected to the carriage 120. The stomp foot 130 is movable along the vertical axis 112. The stomp foot 130 may have a flat or a curved design based upon the geometry of the forming tool 310. In an example, the stomp foot 130 is located between the first end effector 140 and the second end effector 150. The stomp foot 130 is configured to move along the vertical axis 112 via any suitable means and is further configured to press one or more ply 320 of composite material 325 onto a forming surface 308 of a forming tool 310 and hold the one or more ply 320 of composite material 325 in place. In an example, the stomp foot 130 movement is controlled by an actuator 147. In an example, the actuator 147 is a pneumatically actuated forming cylinder 147a. In an example, the stomp foot 130 movement is controlled by at least one magnetic switch configured to detect travel and location of the stomp foot 130 with respect to a forming tool 310. The stomp foot 130 is configured to apply compaction force 350 to a forming tool 310. The applied compaction force 350 may be variable or may be consistent based upon the geometry of the forming tool 310.

In an example, the forming apparatus 100 comprises a ply support feature 185. Ply support feature 185 may be located below the stomp foot 130. Ply support feature 185 may be configured to support one or more ply 320 of composite material 325 prior to initiation of forming. Ply support feature 185 may further be configured to prevent the one or more ply 320 of composite material 325 from wrinkling prior to or during forming. The ply support feature 185 may be mechanical or may be air driven. In an example, the ply support feature 185 is an air knife.

Figure 10A:
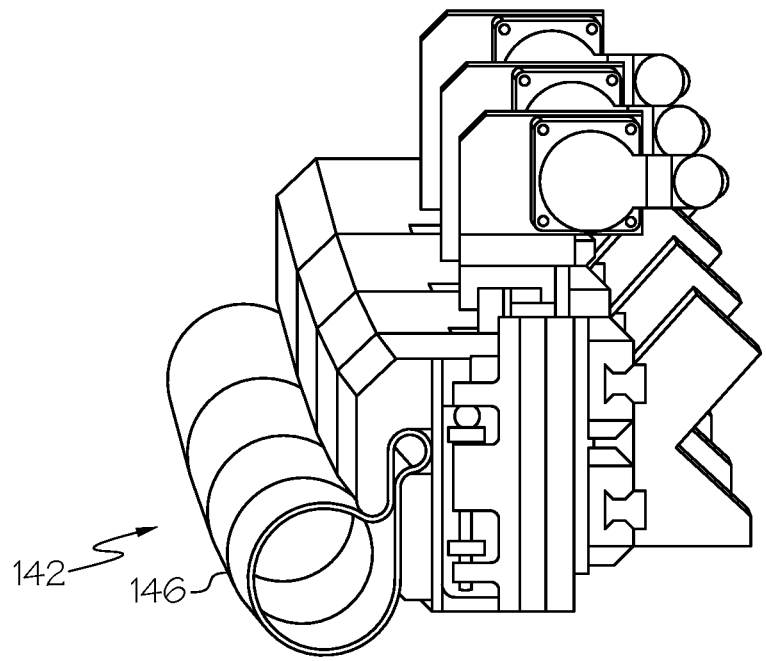
FIG. 10a is an isometric view of a plurality of forming features of the forming apparatus of FIG. 1.
Figure 10B:
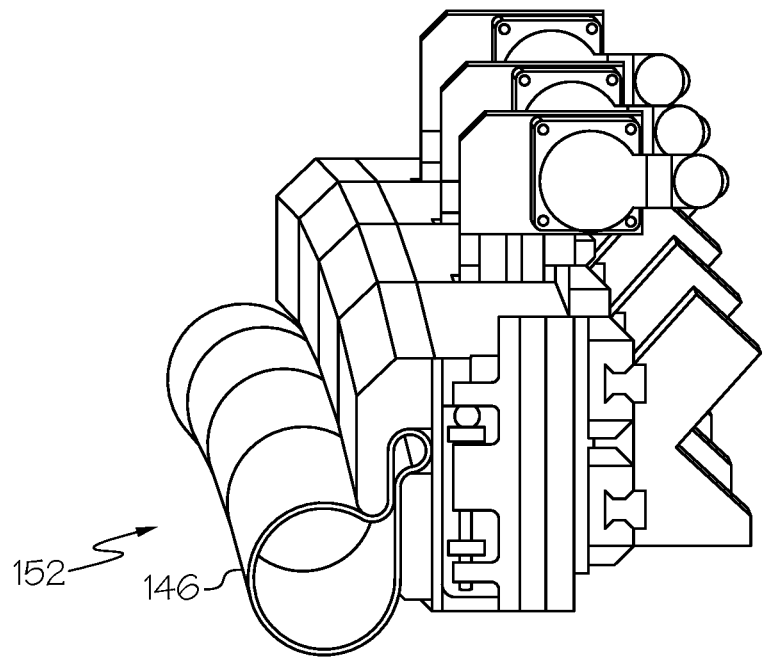
FIG. 10b is an isometric view of a plurality of forming features of the forming apparatus of FIG. 1.

In an example, the forming tool 310 is a stringer forming tool 316. The forming tool 310 may be position on one or more movable form block. The one or more movable form block may be configured to move along the horizontal axis 114 A first plurality 145 of the first end effector 140 and a second plurality 155 of the second end effector 150 are laterally opposed from each other with a stomp foot 130 located between. The configuration of the first plurality 145 of the first end effector 140 and the second plurality 155 of the second end effector 150 to accommodate a stinger forming tool 316 is illustrated in FIG. 10a and FIG. 10b. In this example, the first plurality 145 of the first end effector 140 is convex and the second plurality 155 of the second end effector 150 is concave. FIGS. 16a-16d illustrate various concave and convex configurations that the first plurality 145 of the first end effector 140 and the second plurality 155 of the second end effector 150 can achieve to match the geometry of a forming tool 310. The first forming feature 142 and second forming feature 152 are an inflatable bladder 146.

Figure 9A:
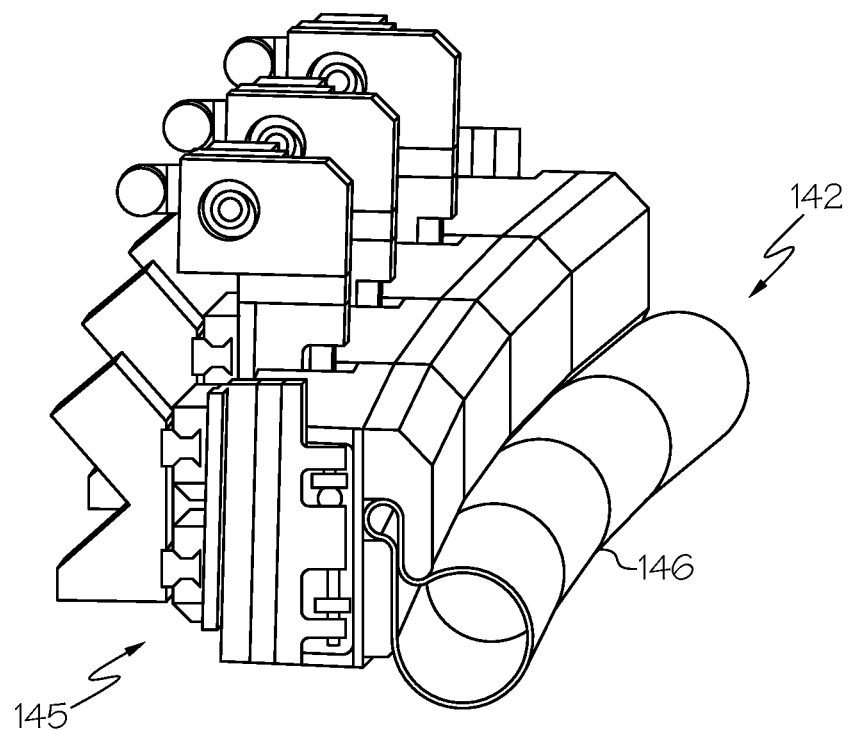
FIG. 9a is an isometric view of a plurality of forming features of the forming apparatus of FIG. 1.
Figure 9B:
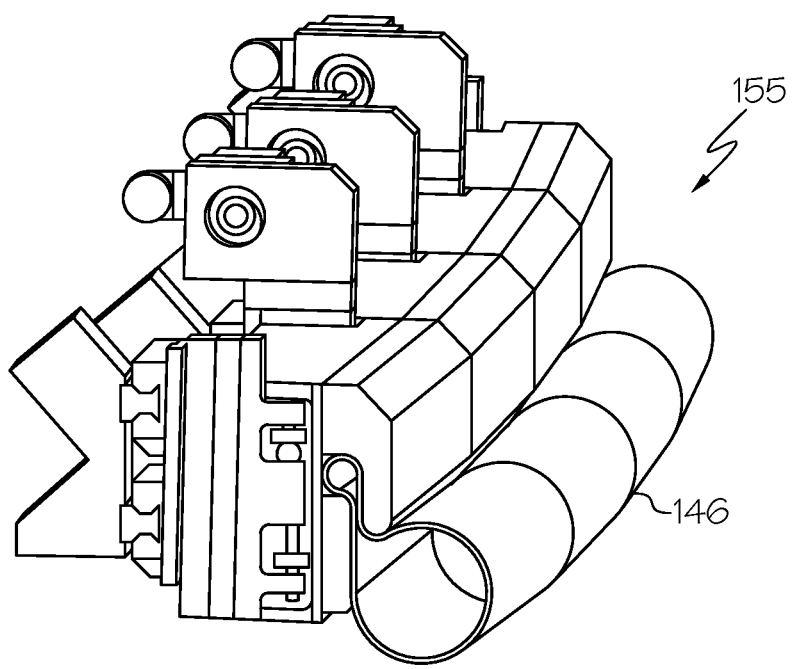
FIG. 9b is an isometric view of a plurality of forming features of the forming apparatus of FIG. 1.

FIG. 9a and FIG. 9b illustrate an example of a first plurality 145 of the first end effector 140 and a second plurality 155 of the second end effector 150, respectively. In an example, the first plurality 145 of the first end effector 140 and the second plurality 155 of the second end effector 150 are configured for a forming tool 310 that is a spar forming tool 314. The configuration of the first plurality 145 of the first end effector 140 is concave and the configuration of the second plurality 155 of the second end effector 150 is convex. While not shown in either of these figures, a stomp foot 130 is located between the first plurality 145 of the first end effector 140 and the second plurality 155 of the second end effector 150. Each individual first end effector 140 of the first plurality 145 and second end effector 150 of the second plurality 155 comprises an inflatable bladder 146 for the first forming feature 142 and second forming feature 152, respectively.

Figure 14:
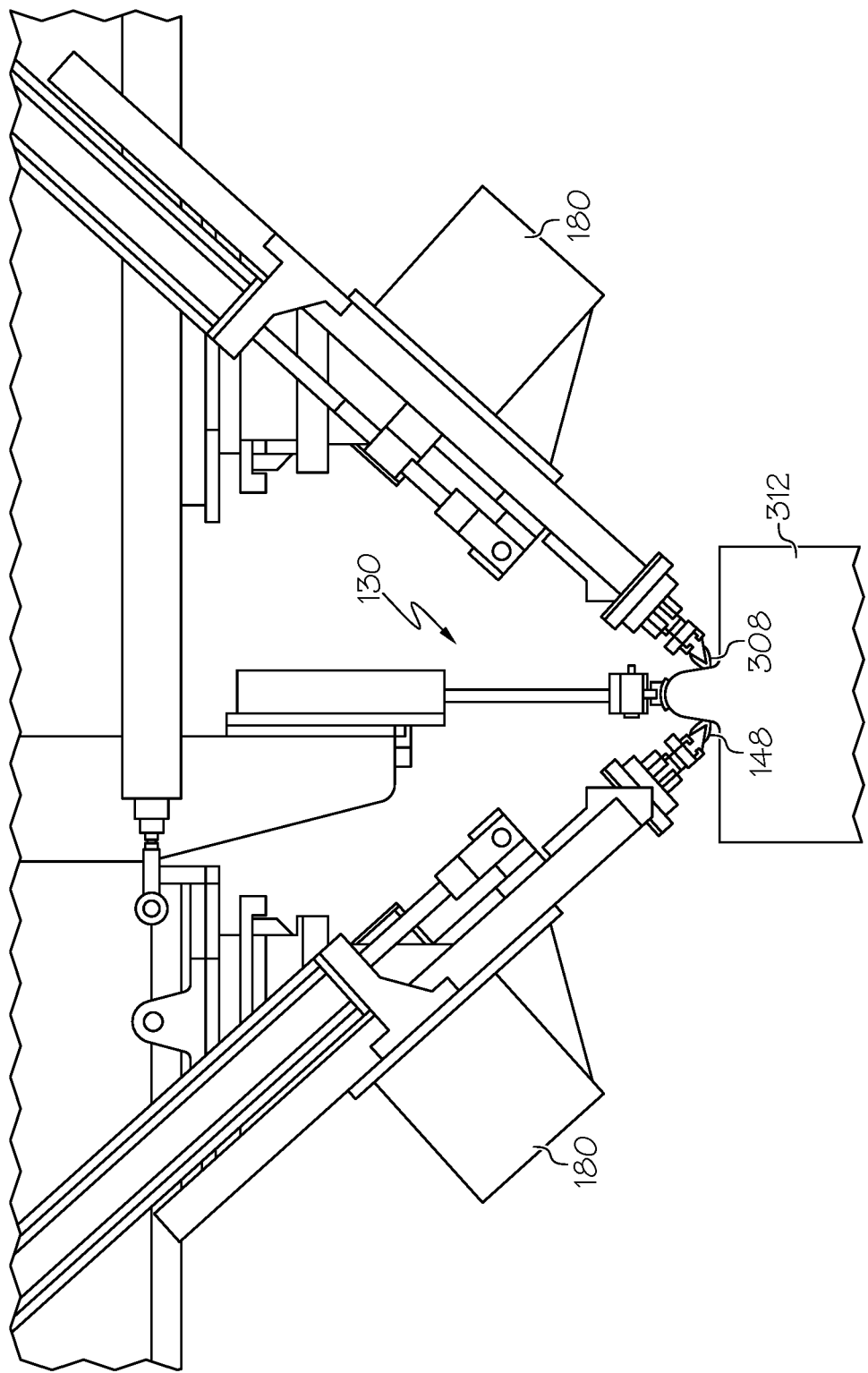
FIG. 14 is a plan view of an exemplary forming apparatus.
Figure 15:
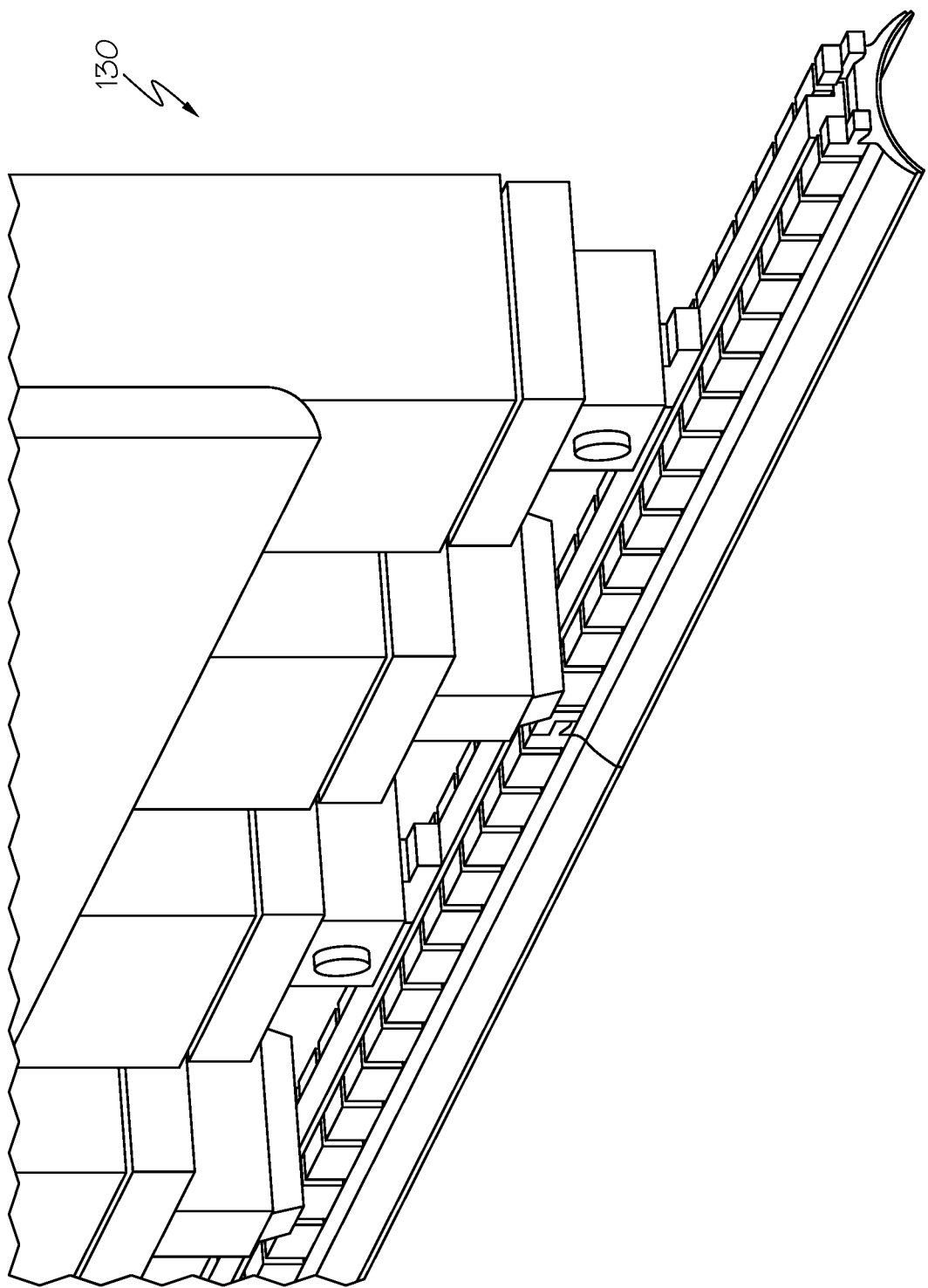
FIG. 15 is an isometric view of a stomp foot of the forming apparatus of FIG. 14
Figure 16A:
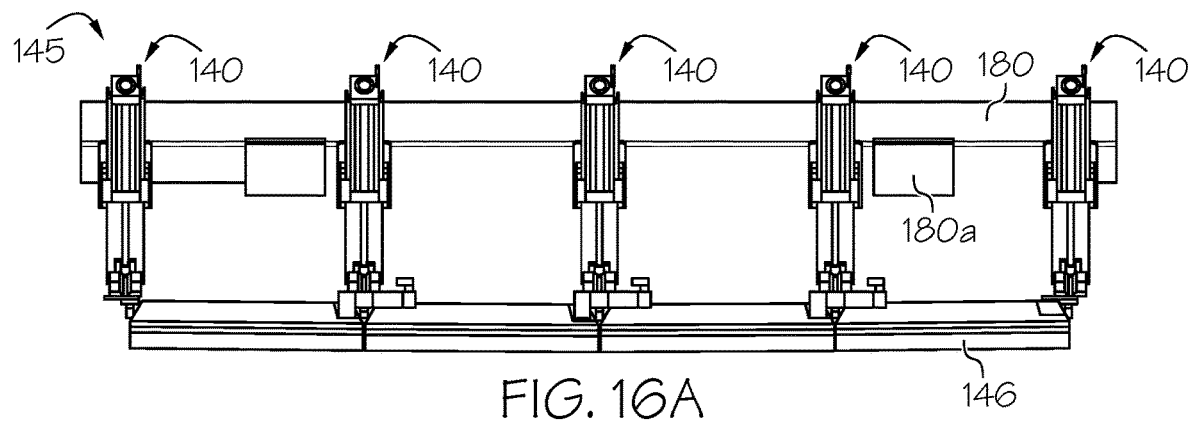
FIG. 16a is a plan view of a plurality of end effectors of the forming apparatus of FIG. 1.
Figure 16B:
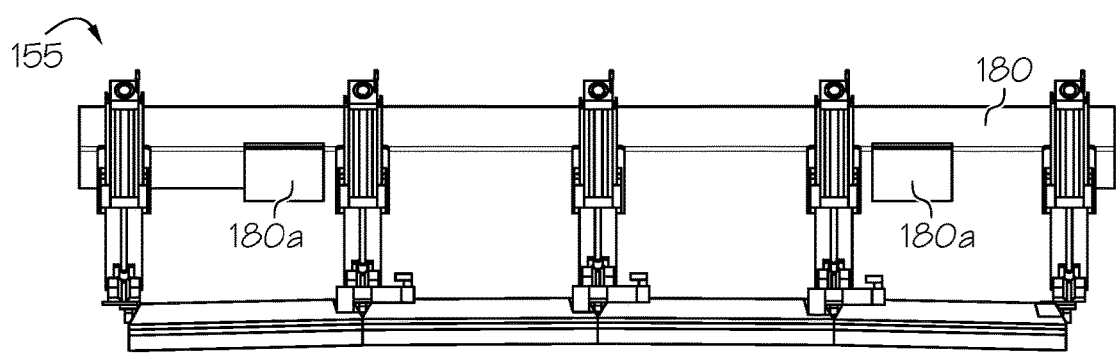
FIG. 16b is a plan view of a plurality of end effectors of the forming apparatus of FIG. 1.
Figure 16C:
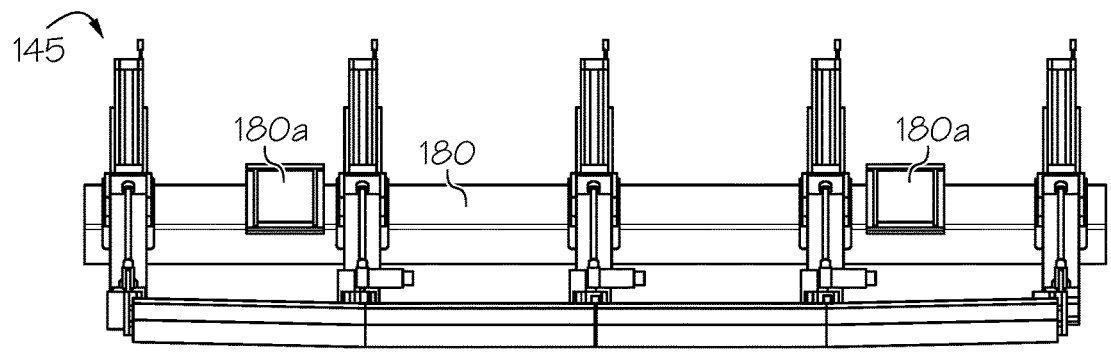
FIG. 16c is a plan view of a plurality of end effectors of the forming apparatus of FIG. 1.
Figure 16D:
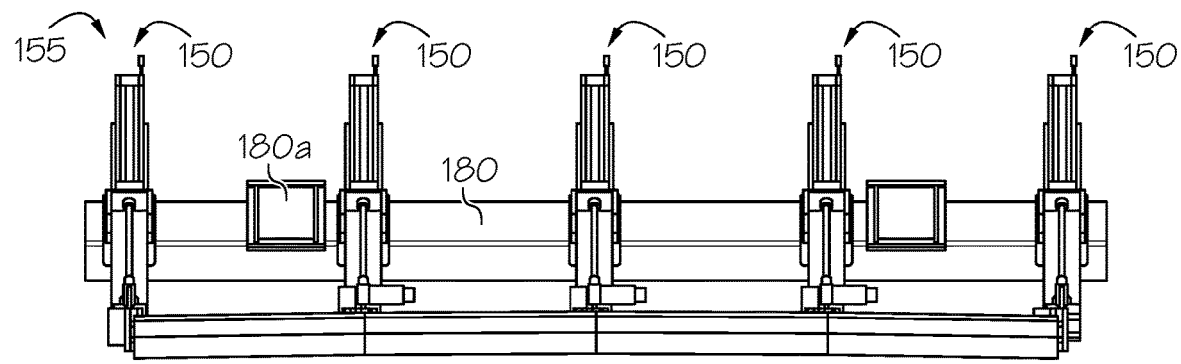
FIG. 16d is a plan view of a plurality of end effectors of the forming apparatus of FIG. 1.

FIG. 14 illustrates a configuration comprising a hat stringer forming tool 312. In this example, the forming tool 310 is a hat stringer forming tool 312. The rounded hat configuration of the hat stringer forming tool 312 requires a stomp foot 130 configuration stiff enough to transfer compaction force 350 while conforming to forming tool 310 geometries, thus it is curved to match the curved configuration of the hat stringer forming tool 312 as shown in FIG. 15. The first end effector 140 and second end effector 150 each utilize a forming finger 148 for the first forming feature 142 and second forming feature 152, respectively. The forming finger 148 allows for access to tight radii and conforming to part geometries such as ramps and ply drops that may not be accessible with an inflatable bladder 146 at high forming or compaction force 350. In an example, a first plurality 145 of the first forming feature 142 and a second plurality 155 of the second forming feature 152 may be generally linear along the longitudinal axis 116.

Figure 6:
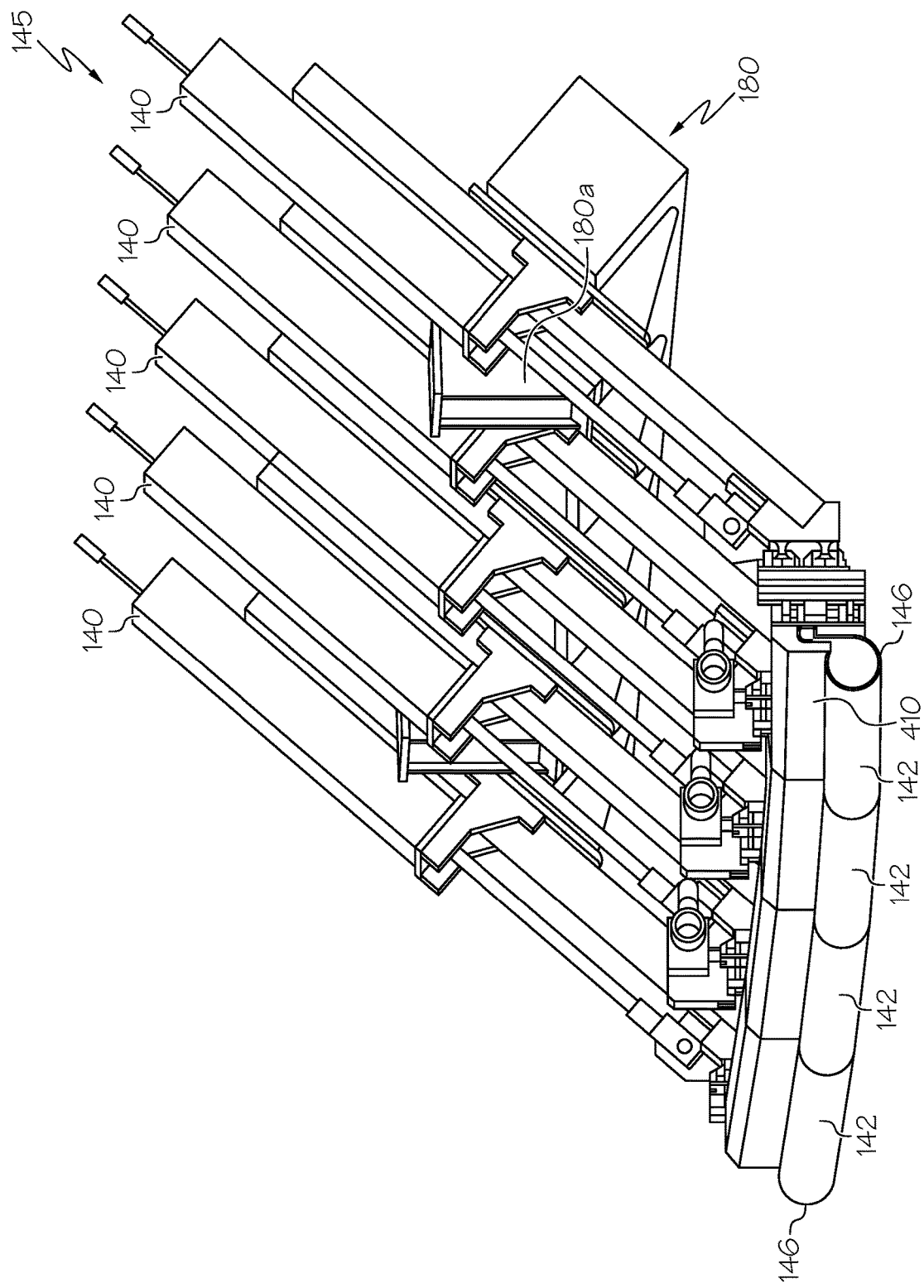
FIG. 6 is an isometric view of a plurality of end effectors of the forming apparatus of FIG. 1.
Figure 7:
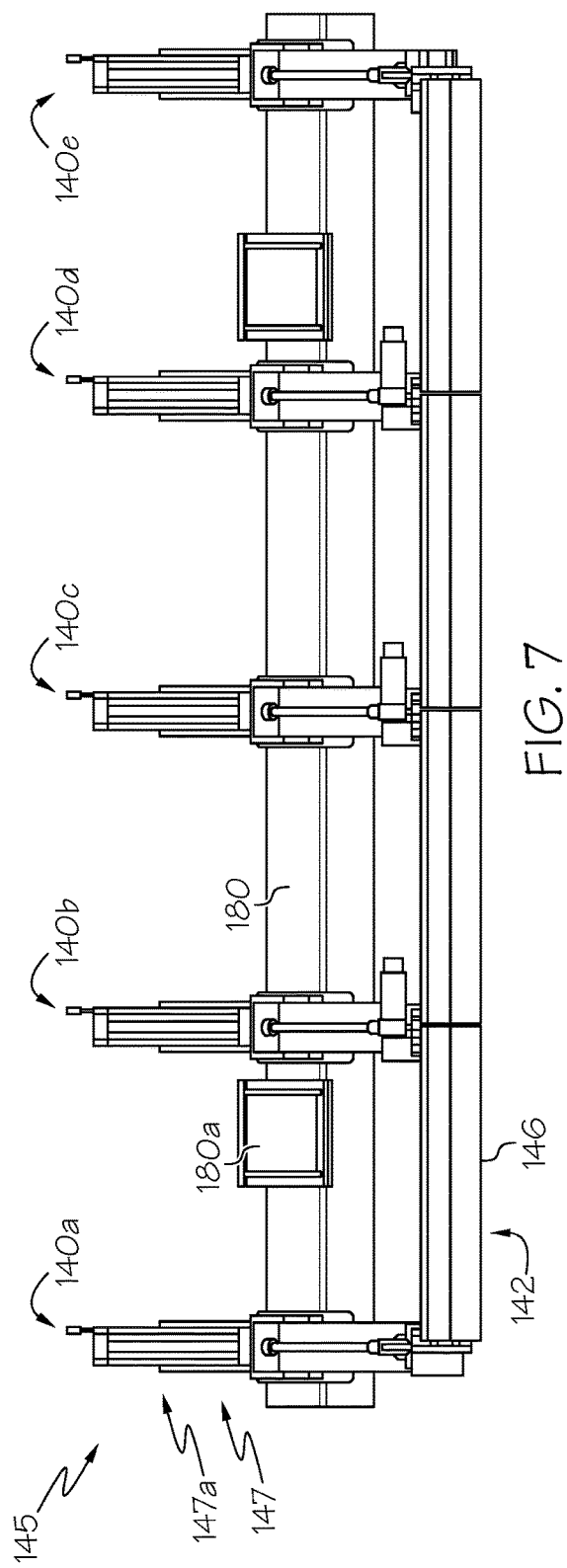
FIG. 7 is an elevation view of a plurality of end effectors of the forming apparatus of FIG. 1.

FIG. 6 and FIG. 7 illustrate a first plurality 145 of first end effector 140 of the forming apparatus 100. In an example, the forming apparatus 100 comprises a first plurality 145 of the first end effector 140. The first plurality 145 of the first end effector 140 extends along the longitudinal axis 116. In an example, each individual first end effector 140 of the first plurality 145 of the first end effector 140 is independently movable. This arrangement allows for the first plurality 145 of the first end effector 140 to form a convex, concave, or linear configuration. In the exemplary embodiment of FIG. 7, the first plurality 145 of the first end effector 140 includes five of the first end effector 140 that are movably connected to a mounting beam 180. The mounting beam 180 is movably connected to the carriage 120 such that it may move along the vertical axis 112 and horizontal axis 114 in accordance with the shape and geometry of a forming tool 310.

In the exemplary embodiment of FIG. 7, first end effector A 140a is movable along the horizontal axis 114 to accommodate a concave, convex, or linear configuration. The movement may be passive such that it moved based upon movement of one or more different first end effector 140 of the first plurality 145 of the first end effector 140. The first end effector A 140a is connected to a first forming feature 142 comprising an inflatable bladder 146. Any suitable means of connection and fastening may be used to secure the first forming feature 142 to the first end effector A 140a. In an example, a screw 149 is used to position and secure the forming feature 142 to the first end effector A 140a.

In an example, the first end effector B 140b is movable along the horizontal axis 114 and the vertical axis 112. Movement along the horizontal axis 114 is passive. Movement along the vertical axis 112 is controlled by any suitable means. In an example, the movement of the first end effector B 140b is controlled by an actuator 147. In an example, the actuator 147 is a pneumatically actuated forming cylinder 147a. Movement of the first end effector B 140b may be controlled by a controller 400. The controller 400 is configured to receive data from one or more sensor 410 and analyze that data to control movement of the first end effector B 140b. The controller 400 may utilize one or more numerical control program 420 in conjunction with the data collected from the one or more sensor 410 to determine proper movement and placement of the first end effector B 140b to properly align with a forming tool 310.

In an example, the first end effector C 140c is movable along the horizontal axis 114 and the vertical axis 112. Movement along the vertical axis 112 is controlled by any suitable means. In an example, the movement of the first end effector C 140c is controlled by an actuator 147. In an example, the actuator 147 is a pneumatically actuated forming cylinder 147a. Movement of the first end effector C 140c may be controlled by a controller 400. The controller 400 is configured to receive data from one or more sensor 410 and analyze that data to control movement of the first end effector C 140c. The controller 400 may utilize one or more numerical control program 420 in conjunction with the data collected from the one or more sensor 410 to determine proper movement and placement of the first end effector C 140c to properly align with a forming tool 310.

In an example, the first end effector D 140d is movable along the vertical axis 112. Movement along the horizontal axis 114 is passive. Movement along the vertical axis 112 is controlled by any suitable means. In an example, the movement of the first end effector D 140d is controlled by an actuator 147. In an example, the actuator 147 is a pneumatically actuated forming cylinder 147a. Movement of the first end effector D 140d may be controlled by a controller 400. The controller 400 is configured to receive data from one or more sensor 410 and analyze that data to control movement of the first end effector D 140d. The controller 400 may utilize one or more numerical control program 420 in conjunction with the data collected from the one or more sensor 410 to determine proper movement and placement of the first end effector D 140d to properly align with a forming tool 310.

In an example, first end effector E 140e is movable along the horizontal axis 114 to accommodate a concave, convex, or linear configuration. The movement may be passive such that it moved based upon movement of one or more different first end effector 140 of the first plurality 145 of the first end effector 140. The first end effector E 140e is connected to a first forming feature 142 comprising an inflatable bladder 146. Any suitable means of connection and fastening may be used to secure the first forming feature 142 to the first end effector E 140e.

In an example, the forming apparatus 100 comprises a second plurality 155 of the second end effector 150. The second plurality 155 of the second end effector 150 extends along the longitudinal axis 116 and is laterally opposed from the second plurality 155 of the second end effector 150. In an example, each individual second end effector 150 of the second plurality 155 of the second end effector 150 is independently movable. This arrangement allows for the second plurality 155 of the second end effector 150 to form a convex, concave, or linear configuration. In the exemplary embodiment of FIG. 8, the second plurality 155 of the second end effector 150 includes five of the second end effector 150 that are movably connected to a mounting beam 180. The mounting beam 180 is movably connected to the carriage 120 such that it may move along the vertical axis 112 and horizontal axis 114 in accordance with the shape and geometry of a forming tool 310.

Figure 8:
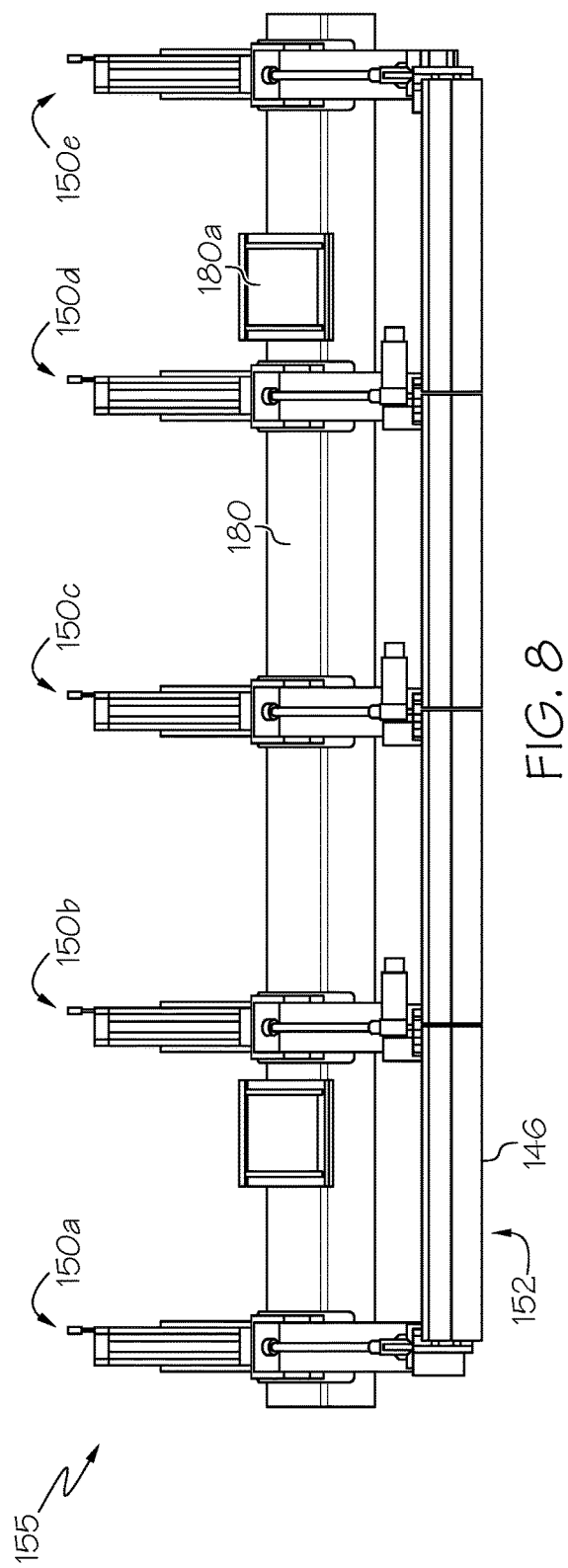
FIG. 8 is an elevation view of a plurality of end effectors of the forming apparatus of FIG. 1.

In the exemplary embodiment of FIG. 8, second end effector A 150a is movable along the horizontal axis 114 to accommodate a concave, convex, or linear configuration. The movement may be passive such that it moved based upon movement of one or more different second end effector 150 of the second plurality 155 of the second end effector 150. The second end effector A 150a is connected to a second forming feature 152 comprising an inflatable bladder 146. Any suitable means of connection and fastening may be used to secure the second forming feature 152 to the second end effector A 150a. In an example, a screw 149 is used to position and secure the second forming feature 152 to the second end effector A 150a.

In an example, the second end effector B 150b is movable along the horizontal axis 114 and the vertical axis 112. Movement along the horizontal axis 114 is passive. Movement along the vertical axis 112 is controlled by any suitable means. In an example, the movement of the second end effector B 150b is controlled by an actuator 147. In an example, the actuator 147 is a pneumatically actuated forming cylinder 147a. Movement of the second end effector B 150b may be controlled by a controller 400. The controller 400 is configured to receive data from one or more sensor 410 and analyze that data to control movement of the second end effector B 150b. The controller 400 may utilize one or more numerical control program 420 in conjunction with the data collected from the one or more sensor 410 to determine proper movement and placement of the second end effector B 150b to properly align with a forming tool 310.

In an example, the second end effector C 150c is movable along the horizontal axis 114 and the vertical axis 112. Movement along the vertical axis 112 is controlled by any suitable means. In an example, the movement of the second end effector C 150c is controlled by an actuator 147. In an example, the actuator 147 is a pneumatically actuated forming cylinder 147a. Movement of the second end effector C 150c may be controlled by a controller 400. The controller 400 is configured to receive data from one or more sensor 410 and analyze that data to control movement of the second end effector C 150c. The controller 400 may utilize one or more numerical control program 420 in conjunction with the data collected from the one or more sensor 410 to determine proper movement and placement of the second end effector C 150c to properly align with a forming tool 310.

In an example, the second end effector D 150d is movable along the vertical axis 112. Movement along the horizontal axis 114 is passive. Movement along the vertical axis 112 is controlled by any suitable means. In an example, the movement of the second end effector D 150d is controlled by an actuator 147. In an example, the actuator 147 is a pneumatically actuated forming cylinder 147a. Movement of the second end effector D 150d may be controlled by a controller 400. The controller 400 is configured to receive data from one or more sensor 410 and analyze that data to control movement of the second end effector D 150d. The controller 400 may utilize one or more numerical control program 420 in conjunction with the data collected from the one or more sensor 410 to determine proper movement and placement of the second end effector D 150d to properly align with a forming tool 310.

In an example, second end effector E 150e is movable along the horizontal axis 114 to accommodate a concave, convex, or linear configuration. The movement may be passive such that it moved based upon movement of one or more different second end effector 150 of the second plurality 155 of the second end effector 150. The second end effector E 150e is connected to a second forming feature 152 comprising an inflatable bladder 146. Any suitable means of connection and fastening may be used to secure the second forming feature 152 to the second end effector E 150e.

Figure 5:
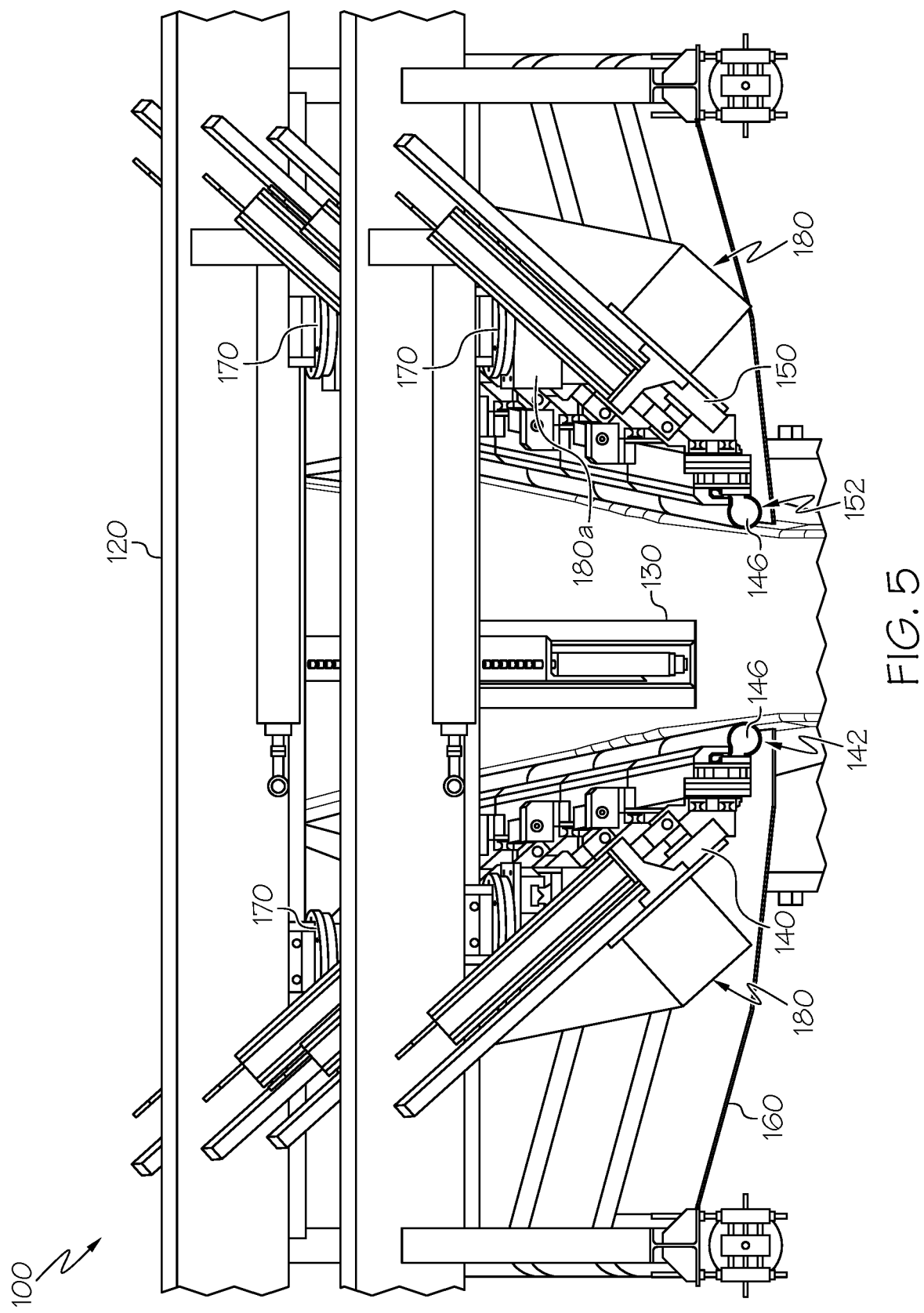
FIG. 5 is an isometric view of the forming apparatus of FIG. 1.

FIG. 3 and FIG. 5 illustrate an exemplary embodiment of the forming apparatus 100 comprising a protective slip film 160. The protective slip film 160 may be of any suitable material including a polymer material such as PTFE or FEP. The protective slip film 160 is connected to a retractable spool 165. The retractable spool 165 is configured to provide constant tension to the protective slip film 160. The protective slip film 160 is advantageous in prevention of bunching of composite material 325 material during the forming process.

Figure 4A:
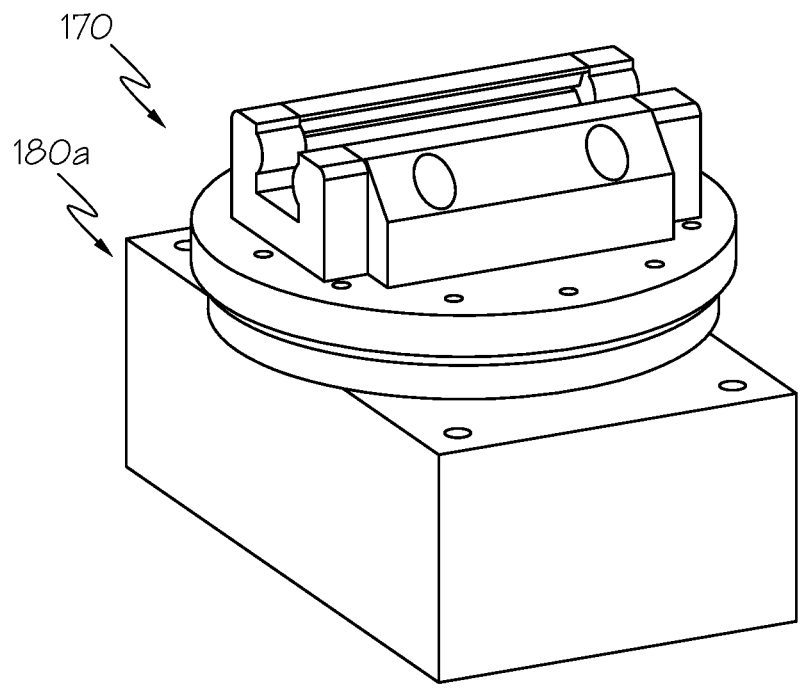
FIG. 4a is an isometric view of a bearing assembly of the forming apparatus of FIG. 1.
Figure 4B:
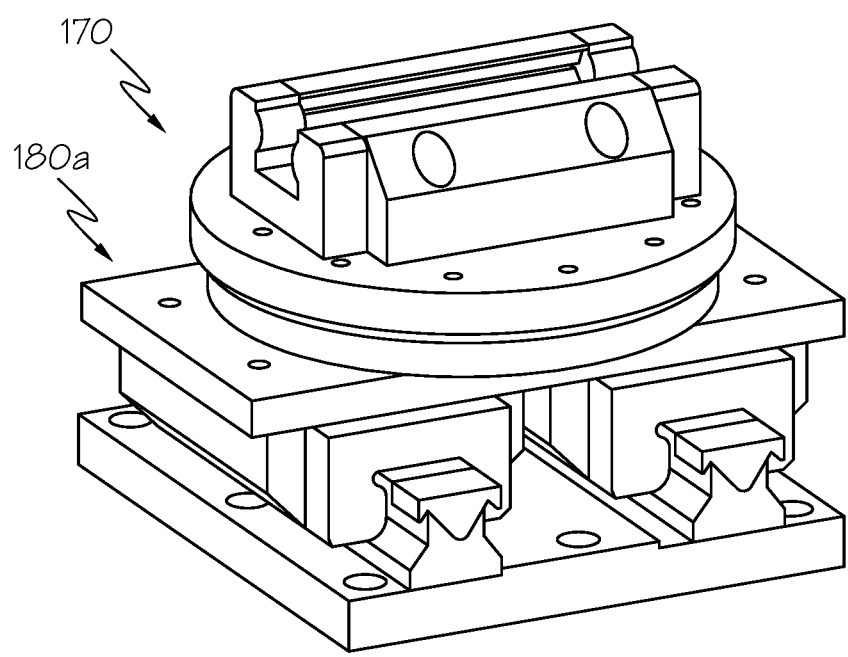
FIG. 4b is an isometric view of a bearing assembly of the forming apparatus of FIG. 1.

FIGS. 4a and 4b illustrate a pivoting bearing assembly 170. The forming apparatus 100 may include more than one pivoting bearing assembly 170 that is movably connected to the carriage 120 and the mounting beam 180 via a bearing mount 180a. The pivoting bearing assembly 170 is configured to have linear and radial configurations. The pivoting bearing assembly 170 allows for adjustments in yaw angle with respect to the first plurality 145 of first end effector 140 and second plurality 155 of the second end effector 150. Adjustments in yaw angle allow for uniform application of compaction force 350 across a forming tool 310, and particularly to a spar forming tool 314.

Figure 19:
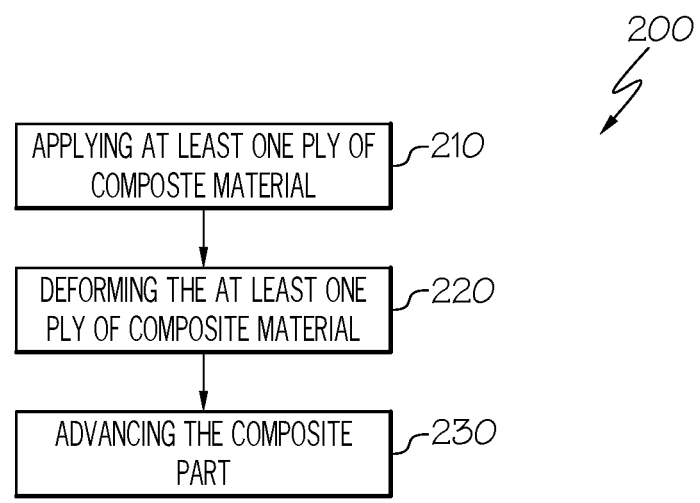
FIG. 19 is a flowchart of a method for forming a composite part.

FIG. 19 illustrates an example of method 200 herein. Disclosed is a method 200 for forming a composite part 375. The method 200 comprises applying 210 at least one ply 320 of composite material 325 over a forming surface 308 of a forming tool 310. The method 200 further comprises deforming 220 the at least one ply 320 of composite material 325 over the forming surface 308 of the forming tool 310 with a forming apparatus 100. The method 200 further comprises advancing 230 the composite part 375 to a subsequent process. In an example, the forming apparatus 100 of the method 200 includes a frame 110. In an example, the frame 110 is generally rectangular in shape. The frame 110 defines a vertical axis 112, a horizontal axis 114, and a longitudinal axis 116. The frame 110 surrounds a carriage 120 having a shape that is generally the same as the frame 110 but is smaller such that the carriage 120 nests within the frame 110. In an example, the carriage 120 is movably connected to the frame 110 such that it may pivot or rotate along the vertical axis 112 and horizontal axis 114 to accommodate any specific geometry or configuration and achieve a best fit position.

In an example, the forming apparatus 100 of the method 200 includes a first end effector 140. The first end effector 140 is movably connected to the carriage 120. In an example, the first end effector 140 is movable via an actuator 147. In an example, the actuator 147 is a pneumatically actuated forming cylinder 147a. The first end effector 140 may include one or more sensor 410 configured to detect the location of a forming tool 310. The one or more sensor 410 may be in communication with a controller 400. The controller 400 is configured to receive data from the one or more sensor 410 and analyze that data to control movement of the first end effector 140. The controller 400 may utilize one or more numerical control program 420 in conjunction with the data collected from the one or more sensor 410 to determine proper movement and placement of the first end effector 140. The first end effector 140 includes a first forming feature 142. In an example, the first forming feature 142 is a forming finger 148. In an example, first forming feature 142 is an inflatable bladder 146.

In an example, the forming apparatus 100 of the method 200 includes a second end effector 150. The second end effector 150 is movably connected to the carriage 120. In an example, the first end effector 140 is laterally opposed from the second end effector 150 relative to the longitudinal axis 116. The first end effector 140 and the second end effector 150 are configured to move independently from each other. In an example, the first end effector 140 and the second end effector 150 are configured to independently move laterally relative to the longitudinal axis 116.

In an example, the second end effector 150 is movable via an actuator 147. In an example, the actuator 147 is a pneumatically actuated forming cylinder 147a. The second end effector 150 may include one or more sensor 410 configured to detect the location and configuration of a forming tool 310. The one or more sensor 410 may be in communication with a controller 400. The controller 400 is configured to receive data from the one or more sensor 410 and analyze that data to control movement of the second end effector 150. The controller may utilize one or more numerical control program 420 in conjunction with the data collected from the one or more sensor 410 to determine proper movement and placement of the second end effector 150. The second end effector includes a second forming feature 152. In an example, the second forming feature 152 is a forming finger 148. In an example, second forming feature 152 is an inflatable bladder 146. The combination of the actuator 147 and carriage 120 act as a driving function to provide mobility across all geometric surfaces of a forming tool 310 in a sweeping and consistent motion.

In an example, the forming apparatus 100 of the method 200 incudes a stomp foot 130 that is movably connected to the carriage 120. The stomp foot 130 is movable along the vertical axis 112. The stomp foot 130 may have a flat or a curved design based upon the geometry of the forming tool 310. In an example, the forming tool 310 is a stringer forming tool 316. In an example, the forming tool 310 is a spar forming tool 314. In an example, the forming tool 310 is a hat stringer forming tool 312. In an example, the stomp foot 130 is located between the first end effector 140 and the second end effector 150. The stomp foot 130 is configured to move along the vertical axis 112 via any suitable means. In an example, the stomp foot 130 movement is controlled by an actuator 147. In an example, the actuator 147 is a pneumatically actuated forming cylinder 147a. In an example, the stomp foot 130 movement is controlled by at least one magnetic switch configured to detect travel and location of the stomp foot 130 with respect to a forming tool 310. The stomp foot 130 is configured to apply compaction force 350 to a forming tool 310. The applied compaction force 350 may be variable or may be consistent based upon the geometry of the forming tool 310.

In an example, the forming apparatus 100 of the method 200 comprises a ply support feature 185. Ply support feature 185 may be located below the stomp foot 130. Ply support feature 185 may be configured to support one or more ply 320 of composite material 325 prior to initiation of forming. Ply support feature 185 may further be configured to prevent the one or more ply 320 of composite material 325 from wrinkling prior to or during forming. The ply support feature 185 may be mechanical or may be air driven. In an example, the ply support feature 185 is an air knife.

In an example, the forming apparatus 100 of the method 200 includes a pivoting bearing assembly 170. The forming apparatus 100 may include more than one pivoting bearing assembly 170 that is movably connected to the carriage 120 and the mounting beam 180 via a bearing mount 180a. The pivoting bearing assembly 170 is configured to have linear and radial configurations. The pivoting bearing assembly 170 allows for adjustments in yaw angle with respect to the first plurality 145 of first end effector 140 and second plurality 155 of the second end effector 150. Adjustments in yaw angle allow for uniform application of compaction force 350 across a forming tool 310, and particularly to a spar forming tool 314.

Figure 11:
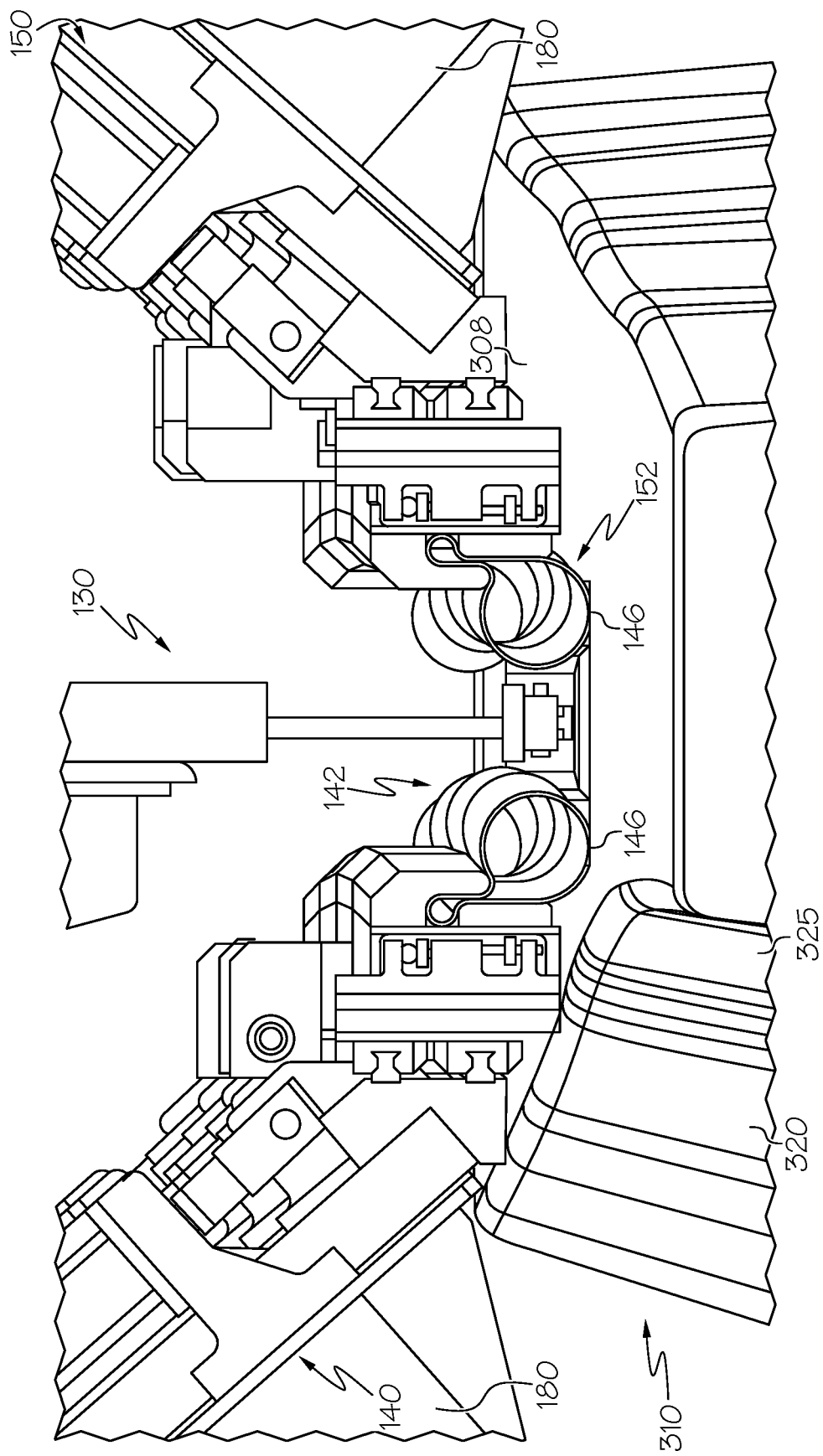
FIG. 11 is an isometric view of the forming apparatus of FIG. 1.
Figure 12:
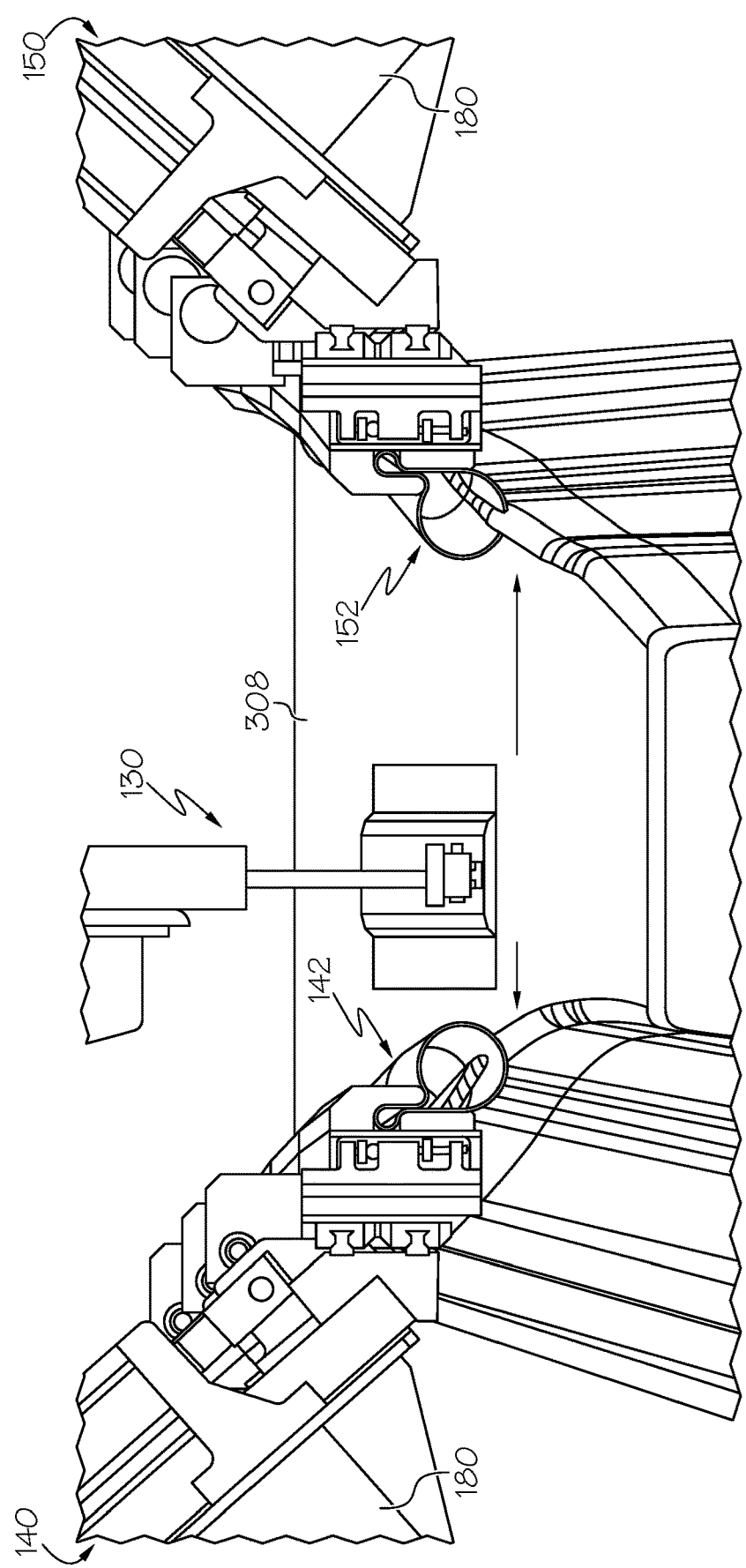
FIG. 12 is an isometric view of the forming apparatus of FIG. 1.
Figure 13:
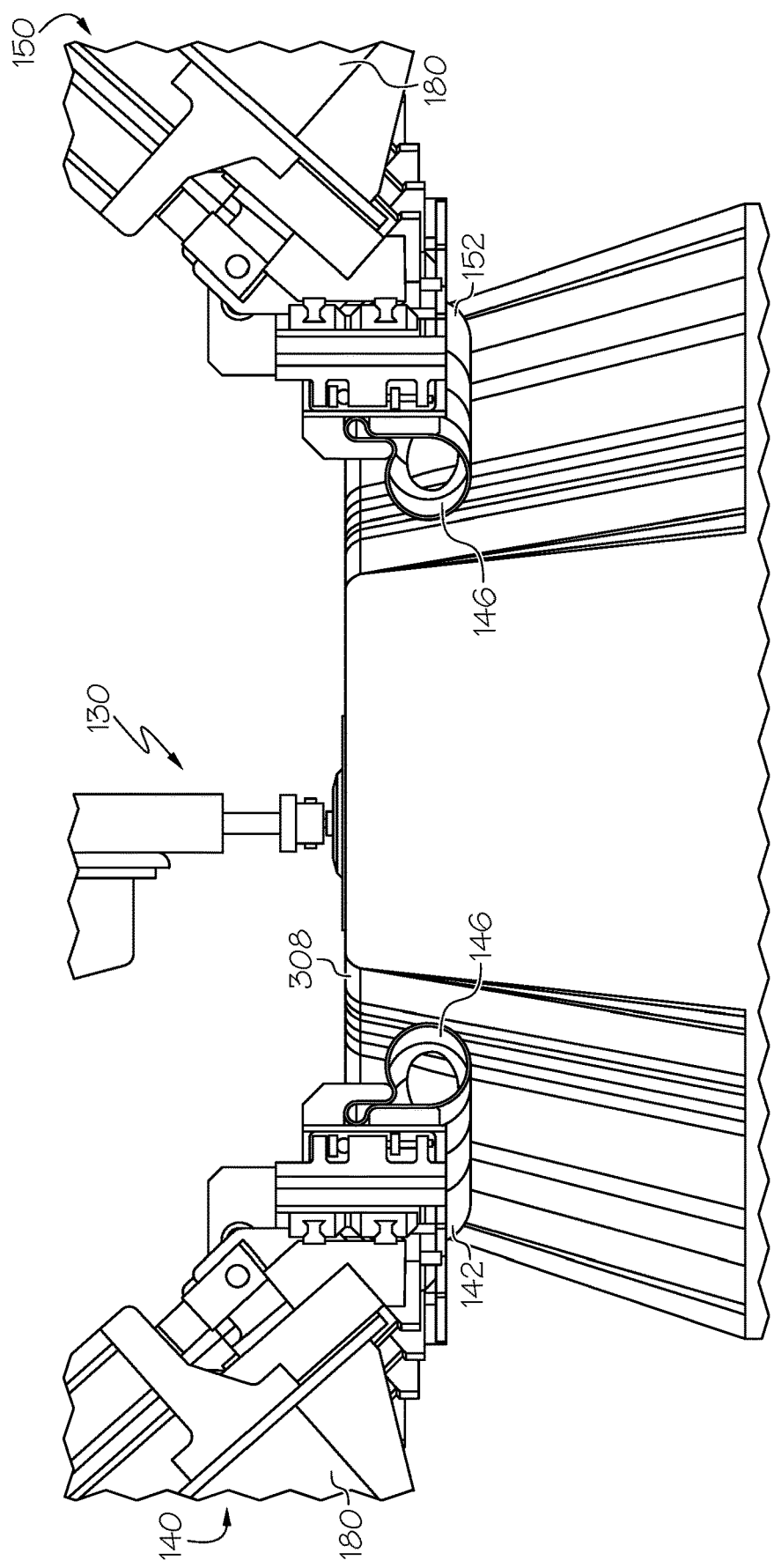
FIG. 13 is an isometric view of the forming apparatus of FIG. 1.

FIG. 11, FIG. 12, and FIG. 13 illustrate an exemplary series of deforming 220 the at least one ply 320 of composite material 325 over the forming surface 308 of the forming tool 310 with a forming apparatus 100. FIG. 11 illustrates initiation of the deforming 220 at least one ply 320 of composite material 325 over the forming surface 308 of a spar forming tool 314. In an example, the stomp foot 130 abuts the forming surface 308 and is located between a first plurality 145 of first end effector 140 and a second plurality 155 of second end effector 150. The first plurality 145 of first end effector 140 is arranged in a convex configuration and is applying compaction force 350 to the forming surface 308. The second plurality 155 of second end effector 150 is laterally opposed from the first plurality 145 of first end effector 140 and is arranged in a convex configuration while applying compaction force 350 to the forming surface 308.

FIG. 12 illustrates progression of the deforming 220 at least one ply 320 of composite material 325 over the forming surface 308 of a spar forming tool 314. The first plurality 145 of first end effector 140 has moved across the horizontal axis 114 while consistently applying compaction force 350 across the forming surface 308. Further, the second plurality 155 of second end effector 150 has moved to the opposing end of the spar forming tool 314 along the horizontal axis 114. Movement of the first plurality 145 of first end effector 140 and second plurality 155 of second end effector 150 along the horizontal axis 114 may be simultaneous or may occur independently based upon forming tool 310 geometry. A controller 400 may utilize one or more numerical control program 420 in conjunction with data collected from one or more sensor 410 to determine proper movement and placement of the first plurality 145 of first end effector 140 and the second plurality 155 of second end effector 150.

FIG. 13 illustrates further progression of the deforming 220 at least one ply 320 of composite material 325 over the forming surface 308 of a spar forming tool 314. The first plurality 145 of first end effector 140 has moved across the horizontal axis 114 and down the vertical axis 112 while consistently applying compaction force 350 across the forming surface 308. Further, the second plurality 155 of second end effector 150 has moved down the vertical axis 112 along the opposing end of the spar forming tool 314 and along the horizontal axis 114.

Figure 22:
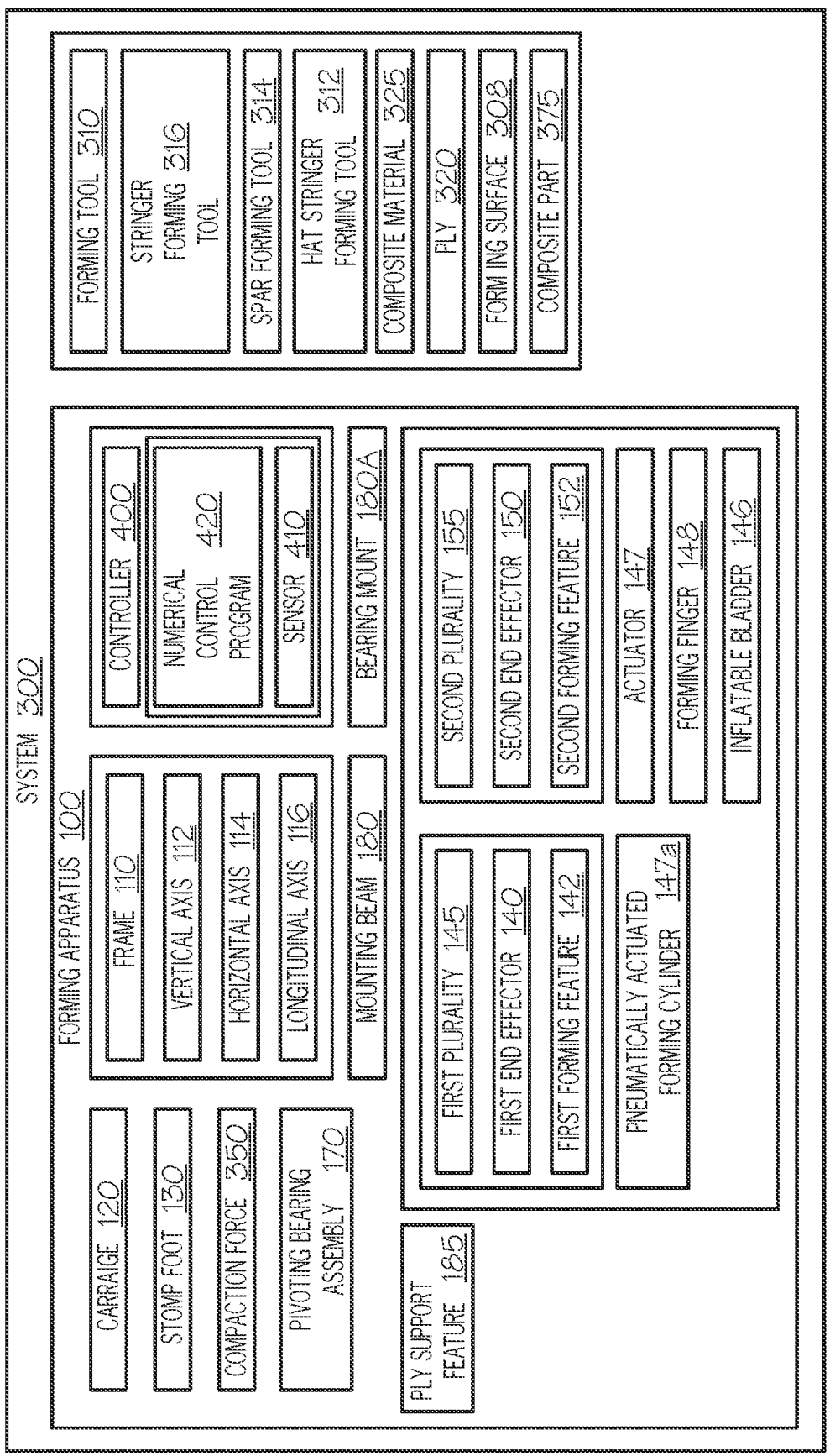
FIG. 22 is a block diagram of a system that can be used with the method of FIG. 21.

FIG. 22 illustrates an example of system 300 herein. In an example, a system 300 is disclosed. The system 300 comprises a forming apparatus 100, a forming tool 310, and at least one ply 320 of composite material 325. In an example, the forming tool 310 is a spar forming tool 314. In an example, the forming tool 310 is a stringer forming tool 316. In an example, the forming tool 310 is a hat stringer forming tool 312.

The forming apparatus 100 of system 300 includes a frame 110. In an example, the frame 110 is generally rectangular in shape. The frame 110 defines a vertical axis 112, a horizontal axis 114, and a longitudinal axis 116. The frame 110 surrounds a carriage 120 having a shape that is generally the same as the frame 110 but is smaller such that the carriage 120 nests within the frame 110. In an example, the carriage 120 is movably connected to the frame 110 such that it may pivot or rotate along the vertical axis 112 and horizontal axis 114 to accommodate any specific geometry or configuration and achieve a best fit position.

In an example, the forming apparatus 100 of the system 300 includes a first end effector 140. The first end effector 140 is movably connected to the carriage 120. In an example, the first end effector 140 is movable via an actuator 147. In an example, the actuator 147 is a pneumatically actuated forming cylinder 147a. The first end effector 140 may include one or more sensor 410 configured to detect the location of a forming tool 310. The one or more sensor 410 may be in communication with a controller 400. The controller 400 is configured to receive data from the one or more sensor 410 and analyze that data to control movement of the first end effector 140. The controller 400 may utilize one or more numerical control program 420 in conjunction with the data collected from the one or more sensor 410 to determine proper movement and placement of the first end effector 140. The first end effector 140 includes a first forming feature 142. In an example, the first forming feature 142 is a forming finger 148. In an example, first forming feature 142 is an inflatable bladder 146.

In an example, the forming apparatus 100 of the system 300 includes a second end effector 150. The second end effector 150 is movably connected to the carriage 120. In an example, the first end effector 140 is laterally opposed from the second end effector 150 relative to the longitudinal axis 116. The first end effector 140 and the second end effector 150 are configured to move independently from each other. In an example, the first end effector 140 and the second end effector 150 are configured to independently move laterally relative to the longitudinal axis 116.

In an example, the second end effector 150 is movable via an actuator 147. In an example, the actuator 147 is a pneumatically actuated forming cylinder 147a. The second end effector 150 may include one or more sensor 410 configured to detect the location and configuration of a forming tool 310. The one or more sensor 410 may be in communication with a controller 400. The controller 400 is configured to receive data from the one or more sensor 410 and analyze that data to control movement of the second end effector 150. The controller may utilize one or more numerical control program 420 in conjunction with the data collected from the one or more sensor 410 to determine proper movement and placement of the second end effector 150. The second end effector includes a second forming feature 152. In an example, the second forming feature 152 is a forming finger 148. In an example, second forming feature 152 is an inflatable bladder 146.

In an example, the forming apparatus 100 of the system 300 incudes a stomp foot 130 that is movably connected to the carriage 120. The stomp foot 130 is movable along the vertical axis 112. The stomp foot 130 may have a flat or a curved design based upon the geometry of the forming tool 310. In an example, the forming tool 310 is a stringer forming tool 316. In an example, the forming tool 310 is a spar forming tool 314. In an example, the forming tool 310 is a hat stringer forming tool 312. In an example, the stomp foot 130 is located between the first end effector 140 and the second end effector 150. The stomp foot 130 is configured to move along the vertical axis 112 via any suitable means. In an example, the stomp foot 130 movement is controlled by an actuator 147. In an example, the actuator 147 is a pneumatically actuated forming cylinder 147a. In an example, the stomp foot 130 movement is controlled by at least one magnetic switch configured to detect travel and location of the stomp foot 130 with respect to a forming tool 310. The stomp foot 130 is configured to apply compaction force 350 to a forming tool 310. The applied compaction force 350 may be variable or may be consistent based upon the geometry of the forming tool 310.

In an example, the forming apparatus 100 of the system 300 comprises a ply support feature 185. Ply support feature 185 may be located below the stomp foot 130. Ply support feature 185 may be configured to support one or more ply 320 of composite material 325 prior to initiation of forming. Ply support feature 185 may further be configured to prevent the one or more ply 320 of composite material 325 from wrinkling prior to or during forming. The ply support feature 185 may be mechanical or may be air driven. In an example, the ply support feature 185 is an air knife.

In an example, the forming apparatus 100 of the system 300 includes a pivoting bearing assembly 170. The forming apparatus 100 may include more than one pivoting bearing assembly 170 that is movably connected to the carriage 120 and the mounting beam 180 via a bearing mount 180a. The pivoting bearing assembly 170 is configured to have linear and radial configurations. The pivoting bearing assembly 170 allows for adjustments in yaw angle with respect to the first plurality 145 of first end effector 140 and second plurality 155 of the second end effector 150. Adjustments in yaw angle allow for uniform application of compaction force 350 across a forming tool 310, and particularly to a spar forming tool 314.

Figure 20:
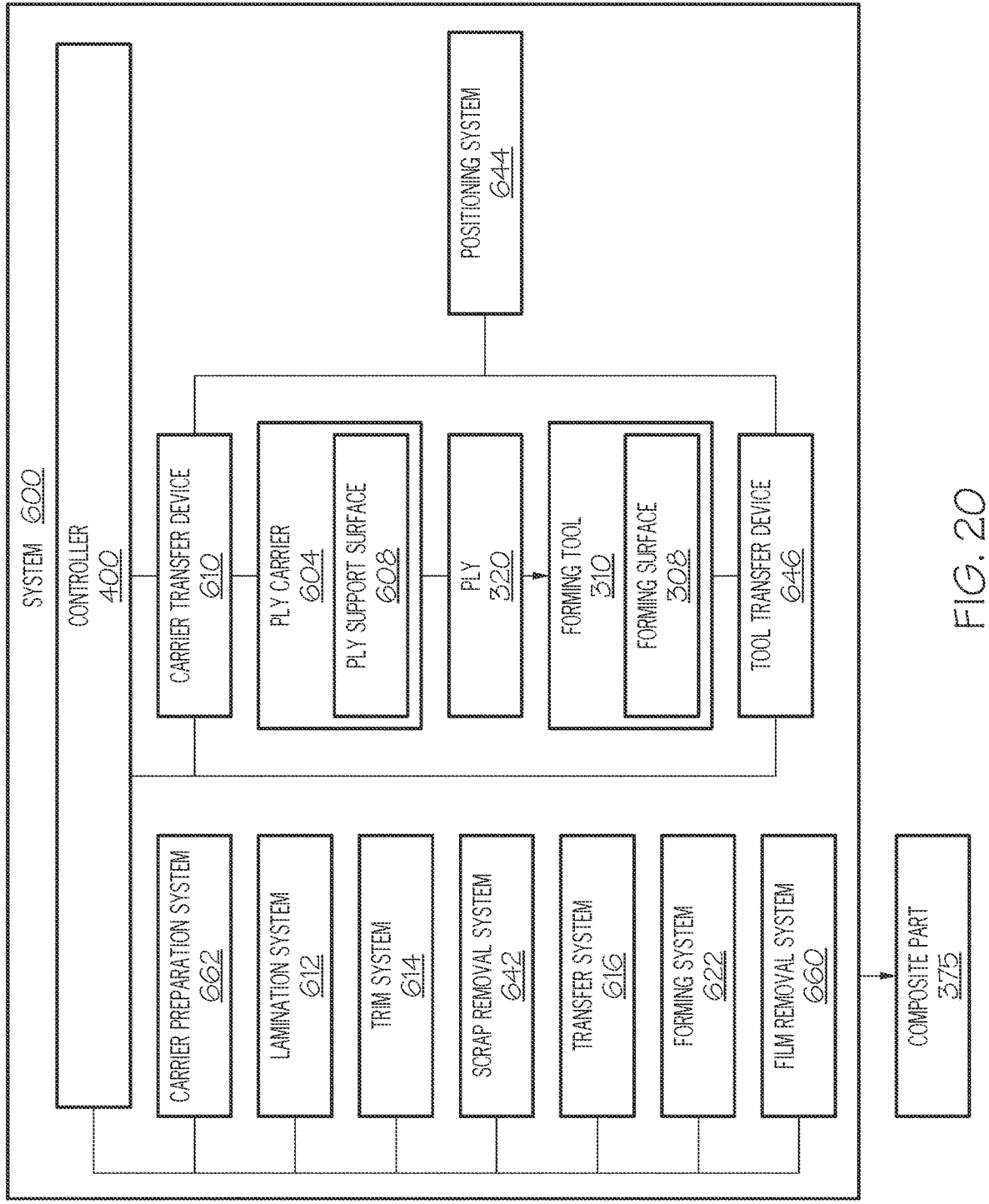
FIG. 20 is a block diagram of a system that can be used with the method of FIG. 19.

FIGS. 18 and 20 illustrate a composite manufacturing system 600. In an example, the composite manufacturing system 600 includes a lamination system 612 (e.g., laminating sub-system or station), a transfer system 616 (e.g., transfer sub-system or station) and a forming system 622 (e.g., forming sub-system or station). In one or more examples, the composite manufacturing system 600 also includes a trim system 614 (e.g., trim sub-system or station) and a scrap removal system 642 (e.g., a scrap removal sub-system of station). In one or more examples, the composite manufacturing system 600 further includes a film removal system 660 (e.g., film removal sub-system or station). In one or more examples, the composite manufacturing system 600 additionally includes a carrier preparation system 662 (e.g., carrier preparation sub-system or station). In one or more examples, the composite manufacturing system 600 also includes a positioning system 644 (e.g., positioning sub-system).

In one or more examples, the composite manufacturing system 600 includes a tool transfer device 646. The tool transfer device 646 is configured to convey the forming tool 310. For example, the tool transfer device 646 includes, or takes the form of, a mobile platform that supports the forming tool 310 and moves the forming tool 310 between the sub-systems of the composite manufacturing system 600 that implement composite structure fabrication operations of the composite manufacturing process.

In an example, the composite manufacturing system 600 for fabricating a composite part 375 includes a ply carrier 604 comprising a ply support surface 608 configured to support at least one ply 320 of composite material 325. The composite manufacturing system 600 further includes a carrier transfer device 610 configured to convey the ply carrier 604, a lamination system 612 configured to selectively apply the at least one ply 320 of composite material 325 to the ply support surface 608 of the ply carrier 604, a transfer system 616 configured to remove the ply carrier 604 from the carrier transfer device 610 and to apply the at least one ply 320 of composite material 325 to at least a portion of a forming surface 308 of a forming tool 310, and a forming system 622 configured to form the at least one ply 320 of composite material 325 over the at least a portion of the forming surface 308 of the forming tool 310. The forming system 622 comprises a forming apparatus 100.

Figure 21:
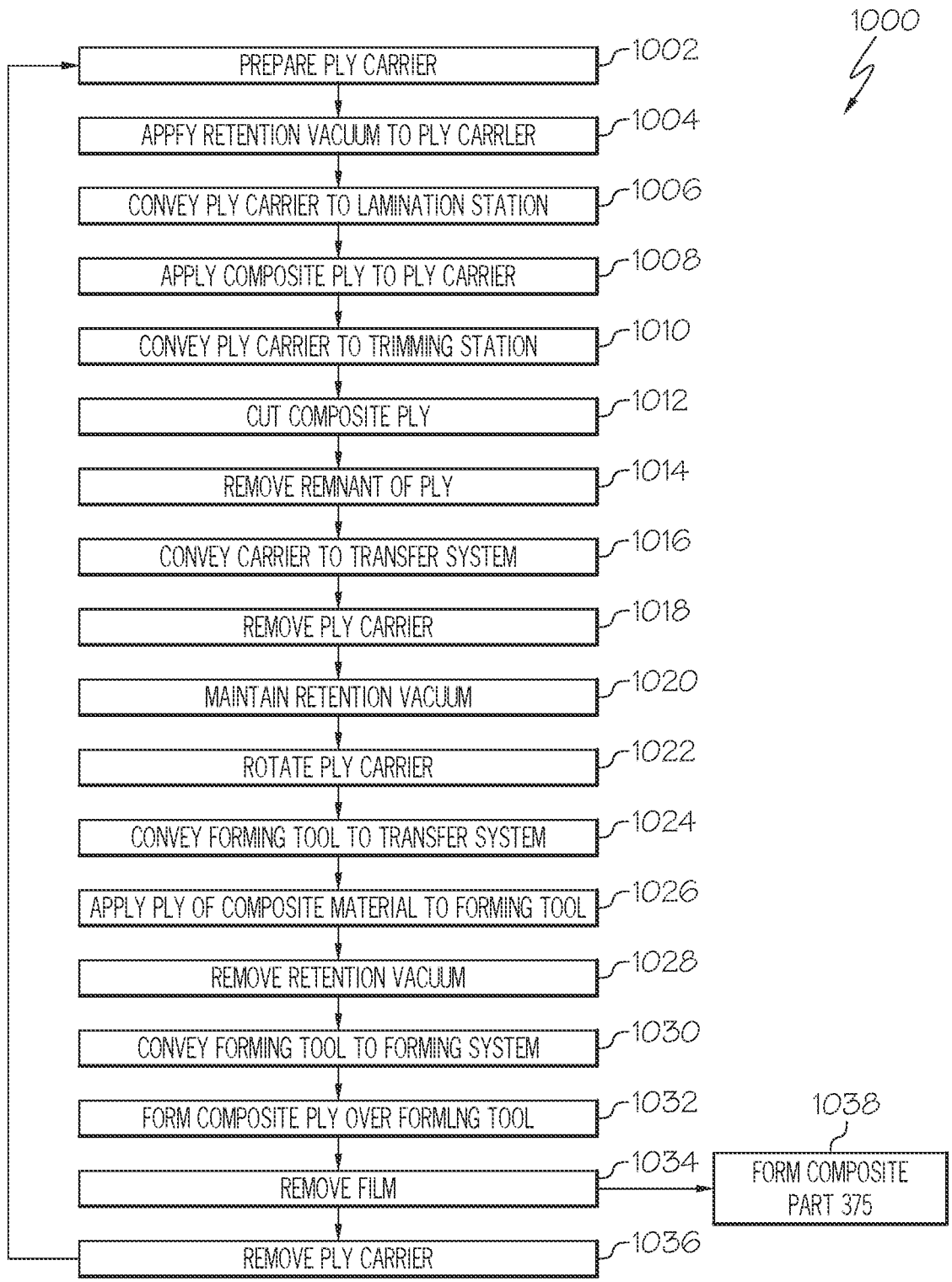
FIG. 21 is a flowchart of a manufacturing method.

FIG. 21 illustrates a flowchart of a manufacturing method 1000. Disclosed is a manufacturing method 1000 of fabricating a composite part 375. In an example, the manufacturing method 1000 comprises various steps. In an example, the manufacturing method 1000 includes conveying a ply carrier 604 to a lamination system 612 using a carrier transfer device 610. The manufacturing method 1000 includes selectively applying at least one ply 320 of composite material 325 to a ply support surface 608 of the ply carrier 604 using the lamination system 612. The manufacturing method 1000 includes conveying the ply carrier 604 from the lamination system 612 to a transfer system 616 using the carrier transfer device 610. In an example, the manufacturing method 1000 includes the step of removing the ply carrier 604 from the carrier transfer device 610 and applying the at least one ply 320 of composite material 325 to at least a portion of a forming surface 308 of a forming tool 310 using the transfer system 616. The manufacturing method 1000 includes the step of forming the at least one ply 320 of composite material 325 over the at least a portion of the forming surface 308 of the forming tool 310 using a forming system 622. In an example, the forming system 622 comprises a forming apparatus 100.

In one or more examples, the manufacturing method 1000 includes a step of (block 1002) preparing the ply carrier 604. In one or more examples, the manufacturing method 1000 includes a step of (block 1004) selectively applying the retention vacuum to retain the protective slip film 160 on the base plate 124 using the carrier transfer device 610. In one or more examples, the manufacturing method 1000 includes a step of (block 1006) conveying the ply carrier 604 to the lamination system 612 using the carrier transfer device 610. In one or more examples, the manufacturing method 1000 includes a step of (block 1008) selectively applying the at least one ply 320 of composite material 325 to the ply support surface 608 of the ply carrier 604 using the lamination system 612. In one or more examples, the manufacturing method 1000 includes a step of (block 1010) conveying the ply carrier 604 from the lamination system 612 to the trim system 614 using the carrier transfer device 610. In one or more examples, the manufacturing method 1000 includes a step of (block 1012) selectively cutting the at least one ply 320 of composite material 325 into the predetermined shape using the trim system 614.

In one or more examples, the manufacturing method 1000 includes a step of (block 1014) removing a remnant of the at least one composite ply 320 of composite material 325 from the ply support surface 608 using the scrap removal system 642, after the step of (block 1012) selectively cutting the at least one ply 320 of composite material 325. In one or more examples, the manufacturing method 1000 includes a step of selectively removing the retention vacuum from select areas of the protective slip film 160 using the carrier transfer device 610. In one or more examples, the manufacturing method 1000 also includes a step of (block 1016) conveying the ply carrier 604 from the trim system 614 to the transfer system 616 using the carrier transfer device 610.

In one or more examples, the manufacturing method 1000 includes a step of (block 1018) removing the ply carrier 604 from the carrier transfer device 610 and a step of (block 1022) reorienting (e.g., rotating) the ply carrier 604 using the transfer system 616. In one or more examples, the manufacturing method 1000 includes a step of (block 1020) maintaining the retention vacuum to retain the protective slip film 160 on the base plate 124 using the transfer system 616. In one or more examples, the manufacturing method 1000 includes a step of (block 1024) conveying the forming tool 310 to the transfer system 616 using the tool transfer device 646. In one or more examples, the manufacturing method 1000 includes a step of (block 1026) applying the at least one ply 320 of composite material 325 to at least a portion of the forming surface 308 of the forming tool 310 using the transfer system 616. In one or more examples, the manufacturing method 1000 includes a step of releasing the protective slip film 160 from the base plate 124 and a step of removing the ply carrier 604 (e.g., the base plate 124) from the forming tool 310 using the transfer system 616, and after the step of (block 1026) applying the at least one ply 320 of composite material 325 to at least a portion of the forming surface 308 of the forming tool 310. For example, the manufacturing method 1000 includes a step of (block 1028) selectively removing the retention vacuum to release the protective slip film 160 from the base plate 124 while retaining the base plate 124 using the transfer system 616.

In one or more examples, the manufacturing method 1000 includes a step of (block 1030) conveying the forming tool 310 from the transfer system 616 to the forming system 622 using the tool transfer device 646. In one or more examples, the manufacturing method 1000 includes a step of (block 1032) forming the at least one ply 320 of composite material 325 over the at least a portion of the forming surface 308 of the forming tool 310 using the forming system 622. In one or more examples, the manufacturing method 1000 includes a step of (block 1034) removing the protective slip film 160 from the at least one ply 320 of composite material 325 using the film removal system 660. In one or more examples, the manufacturing method 1000 includes a step of (block 1036) returning the ply carrier 604 (e.g., the base plate 124) to the carrier transfer device 610 using the transfer system 616. In one or more examples, the above operations are repeated a number of times to fully form the composite part 375 (block 1038), at which point the process terminates.

In an example, the forming apparatus 100 of the manufacturing method 1000 includes a frame 110. In an example, the frame 110 is generally rectangular in shape. The frame 110 defines a vertical axis 112, a horizontal axis 114, and a longitudinal axis 116. The frame 110 surrounds a carriage 120 having a shape that is generally the same as the frame 110 but is smaller such that the carriage 120 nests within the frame 110. In an example, the carriage 120 is movably connected to the frame 110 such that it may pivot or rotate along the vertical axis 112 and horizontal axis 114 to accommodate any specific geometry or configuration and achieve a best fit position.

In an example, the forming apparatus 100 includes a first end effector 140. The first end effector 140 is movably connected to the carriage 120. In an example, the first end effector 140 is movable via an actuator 147. In an example, the actuator 147 is a pneumatically actuated forming cylinder 147a. The first end effector 140 may include one or more sensor 410 configured to detect the location of a forming tool 310 along multiple axes including a vertical axis 112, horizontal axis 114, and longitudinal axis 116 for precise forming on a complex forming tool 310. The one or more sensor 410 may be in communication with a controller 400. The controller 400 is configured to receive data from the one or more sensor 410 and analyze that data to control movement of the first end effector 140. The controller 400 may utilize one or more numerical control program 420 in conjunction with the data collected from the one or more sensor 410 to determine proper movement and placement of the first end effector 140.

The first end effector 140 includes a first forming feature 142. In an example, the first forming feature 142 is a forming finger 148. In an example, first forming feature 142 is an inflatable bladder 146. The inflatable bladder 146 is configured to passively follow forming tool 310 contours by consistently applying compaction force 350. Compaction force 350 may vary. In an example, compaction force 350 may be up to 20 lbs per linear inch. The inflatable bladder

146 profile or orientation may be manipulated with one or more jacking screw 146a to conform to concave or convex profiles along the forming tool 310 length and to control the radius of the inflatable bladder 146. FIG. 17a and FIG. 17b illustrate jacking screw 146a with respect to the inflatable bladder 146.

In an example, the forming apparatus 100 includes a second end effector 150. The second end effector 150 is movably connected to the carriage 120. In an example, the first end effector 140 is laterally opposed from the second end effector 150 relative to the longitudinal axis 116. The first end effector 140 and the second end effector 150 are configured to move independently from each other. In an example, the first end effector 140 and the second end effector 150 are configured to independently move laterally relative to the longitudinal axis 116.

In an example, the second end effector 150 is movable via an actuator 147. In an example, the actuator 147 is a pneumatically actuated forming cylinder 147a. The second end effector 150 may include one or more sensor 410 configured to detect the location and configuration of a forming tool 310. The one or more sensor 410 may be in communication with a controller 400. The controller 400 is configured to receive data from the one or more sensor 410 and analyze that data to control movement of the second end effector 150. The controller may utilize one or more numerical control program 420 in conjunction with the data collected from the one or more sensor 410 to determine proper movement and placement of the second end effector 150. The second end effector includes a second forming feature 152. In an example, the second forming feature 152 is a forming finger 148. In an example, second forming feature 152 is an inflatable bladder 146.

In an example, the forming apparatus 100 of the manufacturing method 1000 incudes a stomp foot 130 that is movably connected to the carriage 120. The stomp foot 130 is movable along the vertical axis 112. The stomp foot 130 may have a flat or a curved design based upon the geometry of the forming tool 310. In an example, the stomp foot 130 is located between the first end effector 140 and the second end effector 150. The stomp foot 130 is configured to move along the vertical axis 112 via any suitable means and is further configured to press one or more ply 320 of composite material 325 onto a forming surface 308 of a forming tool 310 and hold the one or more ply 320 of composite material 325 in place. In an example, the stomp foot 130 movement is controlled by an actuator 147. In an example, the actuator 147 is a pneumatically actuated forming cylinder 147a. In an example, the stomp foot 130 movement is controlled by at least one magnetic switch configured to detect travel and location of the stomp foot 130 with respect to a forming tool 310. The stomp foot 130 is configured to apply compaction force 350 to a forming tool 310. The applied compaction force 350 may be variable or may be consistent based upon the geometry of the forming tool 310.

In an example, the forming apparatus 100 includes a frame 110. In an example, the frame 110 is generally rectangular in shape. The frame 110 defines a vertical axis 112, a horizontal axis 114, and a longitudinal axis 116. The frame 110 surrounds a carriage 120 having a shape that is generally the same as the frame 110 but is smaller such that the carriage 120 nests within the frame 110. In an example, the carriage 120 is movably connected to the frame 110 such that it may pivot or rotate along the vertical axis 112 and horizontal axis 114 to accommodate any specific geometry or configuration and achieve a best fit position.

In an example, the forming apparatus 100 of the manufacturing method 1000 includes a first end effector 140. The first end effector 140 is movably connected to the carriage 120. In an example, the first end effector 140 is movable via an actuator 147. In an example, the actuator 147 is a pneumatically actuated forming cylinder 147a. The first end effector 140 may include one or more sensor 410 configured to detect the location of a forming tool 310 along multiple axes including a vertical axis 112, horizontal axis 114, and longitudinal axis 116 for precise forming on a complex forming tool 310. The one or more sensor 410 may be in communication with a controller 400. The controller 400 is configured to receive data from the one or more sensor 410 and analyze that data to control movement of the first end effector 140. The controller 400 may utilize one or more numerical control program 420 in conjunction with the data collected from the one or more sensor 410 to determine proper movement and placement of the first end effector 140.

The first end effector 140 includes a first forming feature 142. In an example, the first forming feature 142 is a forming finger 148. In an example, first forming feature 142 is an inflatable bladder 146. The inflatable bladder 146 is configured to passively follow forming tool 310 contours by consistently applying compaction force 350. Compaction force 350 may vary. In an example, compaction force 350 may be up to 20 lbs per linear inch. The inflatable bladder 146 profile or orientation may be manipulated with one or more jacking screw 146a to conform to concave or convex profiles along the forming tool 310 length and to control the radius of the inflatable bladder 146. FIG. 17a and FIG. 17b illustrate jacking screw 146a with respect to the inflatable bladder 146.

In an example, the forming apparatus 100 includes a second end effector 150. The second end effector 150 is movably connected to the carriage 120. In an example, the first end effector 140 is laterally opposed from the second end effector 150 relative to the longitudinal axis 116. The first end effector 140 and the second end effector 150 are configured to move independently from each other. In an example, the first end effector 140 and the second end effector 150 are configured to independently move laterally relative to the longitudinal axis 116.

In an example, the second end effector 150 is movable via an actuator 147. In an example, the actuator 147 is a pneumatically actuated forming cylinder 147a. The second end effector 150 may include one or more sensor 410 configured to detect the location and configuration of a forming tool 310. The one or more sensor 410 may be in communication with a controller 400. The controller 400 is configured to receive data from the one or more sensor 410 and analyze that data to control movement of the second end effector 150. The controller may utilize one or more numerical control program 420 in conjunction with the data collected from the one or more sensor 410 to determine proper movement and placement of the second end effector 150. The second end effector includes a second forming feature 152. In an example, the second forming feature 152 is a forming finger 148. In an example, second forming feature 152 is an inflatable bladder 146.

In an example, the forming apparatus 100 incudes a stomp foot 130 that is movably connected to the carriage 120. The stomp foot 130 is movable along the vertical axis 112. The stomp foot 130 may have a flat or a curved design based upon the geometry of the forming tool 310. In an example, the stomp foot 130 is located between the first end effector 140 and the second end effector 150. The stomp foot 130 is configured to move along the vertical axis 112 via any suitable means and is further configured to press one or more ply 320 of composite material 325 onto a forming surface 308 of a forming tool 310 and hold the one or more ply 320 of composite material 325 in place. In an example, the stomp foot 130 movement is controlled by an actuator 147. In an example, the actuator 147 is a pneumatically actuated forming cylinder 147a. In an example, the stomp foot 130 movement is controlled by at least one magnetic switch configured to detect travel and location of the stomp foot 130 with respect to a forming tool 310. The stomp foot 130 is configured to apply compaction force 350 to a forming tool 310. The applied compaction force 350 may be variable or may be consistent based upon the geometry of the forming tool 310.

In an example, the forming apparatus 100 includes a frame 110. In an example, the frame 110 is generally rectangular in shape. The frame 110 defines a vertical axis 112, a horizontal axis 114, and a longitudinal axis 116. The frame 110 surrounds a carriage 120 having a shape that is generally the same as the frame 110 but is smaller such that the carriage 120 nests within the frame 110. In an example, the carriage 120 is movably connected to the frame 110 such that it may pivot or rotate along the vertical axis 112 and horizontal axis 114 to accommodate any specific geometry or configuration and achieve a best fit position.

In an example, the forming apparatus 100 includes a first end effector 140. The first end effector 140 is movably connected to the carriage 120. In an example, the first end effector 140 is movable via an actuator 147. In an example, the actuator 147 is a pneumatically actuated forming cylinder 147a. The first end effector 140 may include one or more sensor 410 configured to detect the location of a forming tool 310 along multiple axes including a vertical axis 112, horizontal axis 114, and longitudinal axis 116 for precise forming on a complex forming tool 310. The one or more sensor 410 may be in communication with a controller 400. The controller 400 is configured to receive data from the one or more sensor 410 and analyze that data to control movement of the first end effector 140. The controller 400 may utilize one or more numerical control program 420 in conjunction with the data collected from the one or more sensor 410 to determine proper movement and placement of the first end effector 140.

The first end effector 140 includes a first forming feature 142. In an example, the first forming feature 142 is a forming finger 148. In an example, first forming feature 142 is an inflatable bladder 146. The inflatable bladder 146 is configured to passively follow forming tool 310 contours by consistently applying compaction force 350. Compaction force 350 may vary. In an example, compaction force 350 may be up to 20 lbs per linear inch. The inflatable bladder 146 profile or orientation may be manipulated with one or more jacking screw 146a to conform to concave or convex profiles along the forming tool 310 length and to control the radius of the inflatable bladder 146. FIG. 17a and FIG. 17b illustrate jacking screw 146a with respect to the inflatable bladder 146.

In an example, the forming apparatus 100 of the manufacturing method 1000 includes a second end effector 150. The second end effector 150 is movably connected to the carriage 120. In an example, the first end effector 140 is laterally opposed from the second end effector 150 relative to the longitudinal axis 116. The first end effector 140 and the second end effector 150 are configured to move independently from each other. In an example, the first end effector 140 and the second end effector 150 are configured to independently move laterally relative to the longitudinal axis 116.

In an example, the second end effector 150 is movable via an actuator 147. In an example, the actuator 147 is a pneumatically actuated forming cylinder 147a. The second end effector 150 may include one or more sensor 410 configured to detect the location and configuration of a forming tool 310. The one or more sensor 410 may be in communication with a controller 400. The controller 400 is configured to receive data from the one or more sensor 410 and analyze that data to control movement of the second end effector 150. The controller may utilize one or more numerical control program 420 in conjunction with the data collected from the one or more sensor 410 to determine proper movement and placement of the second end effector 150. The second end effector includes a second forming feature 152. In an example, the second forming feature 152 is a forming finger 148. In an example, second forming feature 152 is an inflatable bladder 146.

In an example, the forming apparatus 100 incudes a stomp foot 130 that is movably connected to the carriage 120. The stomp foot 130 is movable along the vertical axis 112. The stomp foot 130 may have a flat or a curved design based upon the geometry of the forming tool 310. In an example, the stomp foot 130 is located between the first end effector 140 and the second end effector 150. The stomp foot 130 is configured to move along the vertical axis 112 via any suitable means and is further configured to press one or more ply 320 of composite material 325 onto a forming surface 308 of a forming tool 310 and hold the one or more ply 320 of composite material 325 in place. In an example, the stomp foot 130 movement is controlled by an actuator 147. In an example, the actuator 147 is a pneumatically actuated forming cylinder 147a. In an example, the stomp foot 130 movement is controlled by at least one magnetic switch configured to detect travel and location of the stomp foot 130 with respect to a forming tool 310. The stomp foot 130 is configured to apply compaction force 350 to a forming tool 310. The applied compaction force 350 may be variable or may be consistent based upon the geometry of the forming tool 310.

Figure 23:
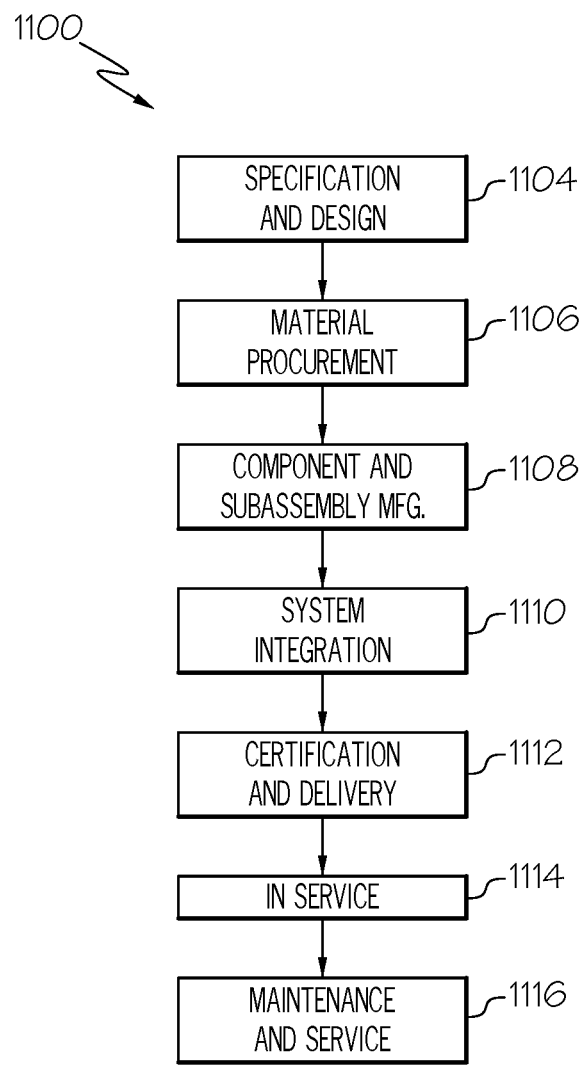
FIG. 23 is a flow diagram of an aircraft manufacturing and service methodology.
Figure 24:
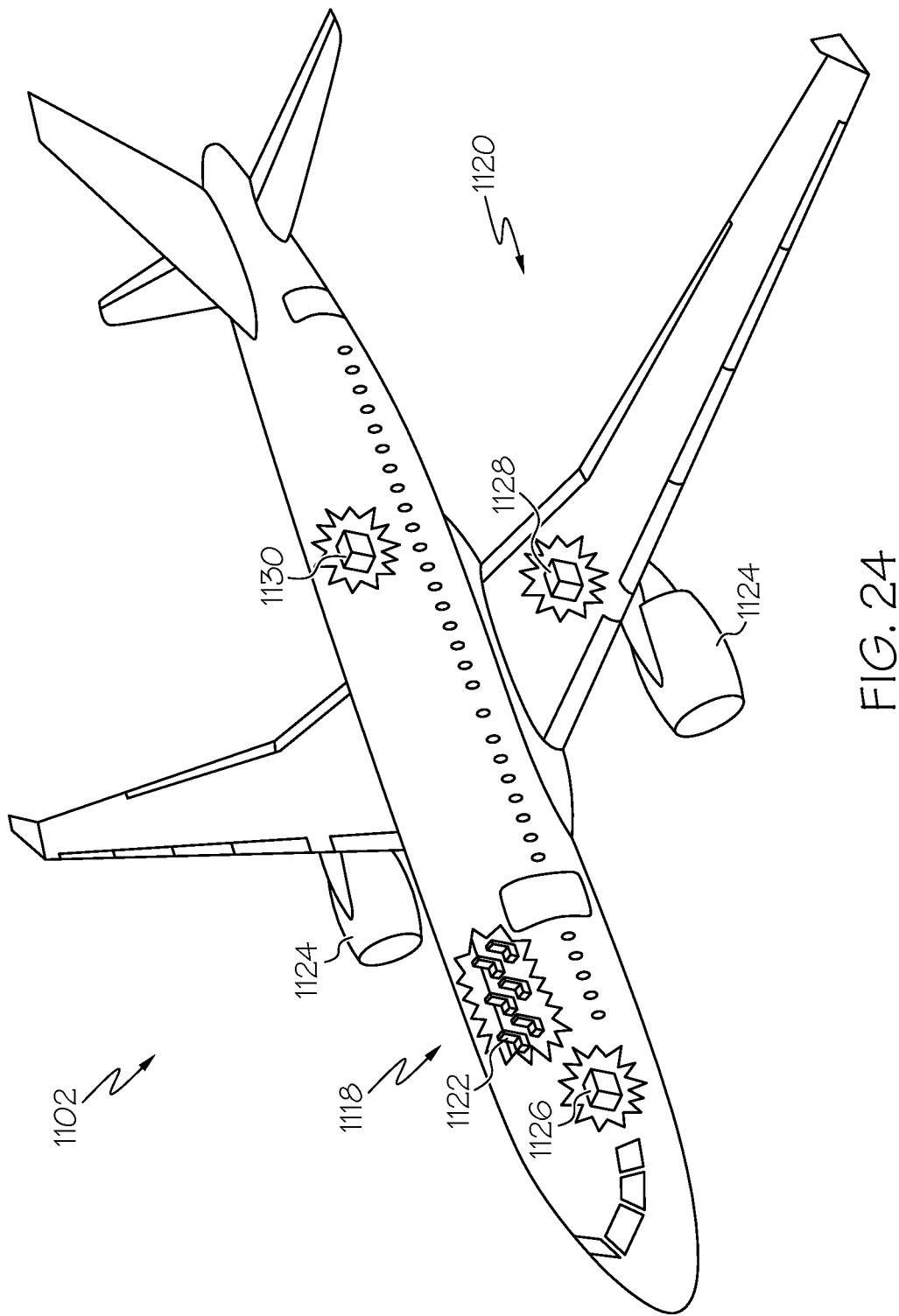
FIG. 24 is a block diagram of an aircraft.

Examples of the disclosure may be described in the context of an aircraft manufacturing and service method 1100, as shown in FIG. 23, and an aircraft 1102, as shown in FIG. 24. During pre-production, the aircraft manufacturing and service method 1100 may include specification and design 1104 of the aircraft 1102 and material procurement 1106. During production, component/subassembly manufacturing 1108 and system integration 1110 of the aircraft 1102 takes place. Thereafter, the aircraft 1102 may go through certification and delivery 1112 in order to be placed in service 1114. While in service by a customer, the aircraft 1102 is scheduled for routine maintenance and service 1116, which may also include modification, reconfiguration, refurbishment and the like.

Each of the steps of the aircraft manufacturing and service method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 24, the aircraft 1102 produced by the example aircraft manufacturing and service method 1100 may include an airframe 1118 with a plurality of systems 1120 and an interior 1122. Examples of the plurality of systems 1120 may include one or more of a propulsion system 1124, an electrical system 1126, a hydraulic system 1128, and an environmental system 1130. Any number of other systems may be included.

The disclosed methods and systems may be employed during any one or more of the stages of the aircraft manufacturing and service method 1100. As one example, components or subassemblies corresponding to component/subassembly manufacturing 1108, system integration 1110 and/or maintenance and service 1116 may be assembled using the disclosed methods and systems. As another example, the airframe 1118 may be constructed using the disclosed methods and systems. Also, one or more apparatus examples, method examples, or a combination thereof may be utilized during component/subassembly manufacturing 1108 and/or system integration 1110, for example, by substantially expediting assembly of or reducing the cost of an aircraft 1102, such as the airframe 1118 and/or the interior 1122. Similarly, one or more of system examples, method examples, or a combination thereof may be utilized while the aircraft 1102 is in service, for example and without limitation, to maintenance and service 1116.

Aspects of disclosed examples may be implemented in software, hardware, firmware, or a combination thereof. The various elements of the system, either individually or in combination, may be implemented as a computer program product tangibly embodied in a machine-readable storage device for execution by a processor. Various steps of examples may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed examples can be loaded onto a computer.

The above-described methods and systems are described in the context of an aircraft. However, one of ordinary skill in the art will readily recognize that the disclosed methods and systems are suitable for a variety of applications, and the present disclosure is not limited to aircraft manufacturing applications. For example, the disclosed methods and systems may be implemented in various types of vehicles including, for example, helicopters, passenger ships, automobiles, marine products (boat, motors, etc.) and the like. Non-vehicle applications are also contemplated.

Also, although the above-description describes methods and systems that may be used to manufacture an aircraft or aircraft component in the aviation industry in accordance with various regulations (e.g., commercial, military, etc.), it is contemplated that the disclosed methods and systems may be implemented to facilitate manufacturing of a part in any industry in accordance with the applicable industry standards. The specific methods and systems can be selected and tailored depending upon the particular application.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the forming apparatus 100, method 200, and system 300 have been shown and described, modifications may occur to those skilled in the art upon reading the specification. The present application includes such modifications and is limited only by the scope of the claims.

What is claimed is:

1. A forming apparatus comprising:
   a frame defining a vertical axis, a horizontal axis, and a longitudinal axis;
   a carriage movably connected to the frame;
   a stomp foot movably connected to the carriage;
   a first end effector movably connected to the carriage and laterally adjacent to the stomp foot; and
   a second end effector movably connected to the carriage and laterally opposed from the first end effector relative to the longitudinal axis such that the stomp foot is between the first end effector and the second end effector,
   wherein the first end effector and the second end effector are adjustable in a yaw angle to the longitudinal axis.

2. The forming apparatus of claim 1 wherein the first end effector comprises a first forming feature and the second end effector comprises a second forming feature, and
   wherein the first forming feature comprises a first inflatable bladder and the second forming feature comprises a second inflatable bladder.

3. The forming apparatus of claim 1 wherein the first end effector and the second end effector are configured to independently move laterally relative to the longitudinal axis.

4. The forming apparatus of claim 1 comprising a first plurality of the first end effector extending along the longitudinal axis and a second plurality of the second end effector extending along the longitudinal axis and laterally opposed from the first plurality, and
   wherein each first end effector of the first plurality is independently movable such that the first plurality may form a convex, concave, or linear configuration.

5. The forming apparatus of claim 1 comprising a protective slip film, and
   wherein the protective slip film is connected to at least one retractable spool.

6. The forming apparatus of claim 1 wherein the stomp foot is configured to move along the vertical axis and apply compaction force.

7. A method for forming a composite part, the method comprising:
   applying at least one ply of composite material over a forming surface of a forming tool; and
   deforming the at least one ply of composite material over the forming surface of the forming tool with the forming apparatus of claim 1.

8. A system for forming a composite part, the system comprising:
   the forming apparatus of claim 1;
   a forming tool; and
   at least one ply of composite material.

9. A composite manufacturing system for fabricating a composite part, the composite manufacturing system comprising:
   a ply carrier comprising a ply support surface configured to support at least one ply of composite material;
   a carrier transfer device configured to convey the ply carrier;

a lamination system configured to selectively apply the at least one ply of composite material to the ply support surface of the ply carrier;
a transfer system configured to remove the ply carrier from the carrier transfer device and to apply the at least one ply of composite material to at least a portion of a forming surface of a forming tool; and
a forming system configured to form the at least one ply of composite material over the at least a portion of the forming surface of the forming tool, the forming system comprises:
the forming apparatus of claim 1.

10. A manufacturing method of fabricating a composite part, the manufacturing method comprising steps of:
conveying a ply carrier to a lamination system using a carrier transfer device;
selectively applying at least one ply of composite material to a ply support surface of the ply carrier using the lamination system;
conveying the ply carrier from the lamination system to a transfer system using the carrier transfer device;
removing the ply carrier from the carrier transfer device and applying the at least one ply of composite material to at least a portion of a forming surface of a forming tool using the transfer system; and
forming the at least one ply of composite material over the at least a portion of the forming surface of the forming tool using a forming system, the forming system comprising:
the forming apparatus of claim 1.

11. The forming apparatus of claim 1, further comprising:
a first pivoting bearing assembly connected to the carriage and operatively coupled to the first end effector to allow adjustments in the yaw angle of the first end effector to the longitudinal axis; and
a second pivoting bearing assembly connected to the carriage and operatively coupled to the second end effector to allow adjustments in the yaw angle of the second end effector to the longitudinal axis.

12. The forming apparatus of claim 11 wherein the adjustments in the yaw angle of the first end effector and the second end effector allow for uniform application of a compaction force across a forming tool associated with the forming apparatus.

13. The forming apparatus of claim 2 wherein radii of the first inflatable bladder and the second inflatable bladder are independently adjustable.

14. The forming apparatus of claim 13 wherein independent adjustments of the radius of the first inflatable bladder and of the radius of the second inflatable bladder allow for independent conformity of the first end effector and the second end effector to a forming tool associated with the forming apparatus.

15. The forming apparatus of claim 1 wherein the first end effector and the second end effector are movable along the horizontal axis, and
wherein movement of the first end effector and the second end effector along the horizontal axis accommodates concave, convex, and linear aspects of a forming tool associated with the forming apparatus.

16. A forming apparatus comprising:
a frame defining a vertical axis, a horizontal axis, and a longitudinal axis;
a carriage movably connected to the frame;
a stomp foot movably connected to the carriage;
a first end effector movably connected to the carriage and laterally adjacent to the stomp foot; and
a second end effector movably connected to the carriage and laterally opposed from the first end effector relative to the longitudinal axis such that the stomp foot is between the first end effector and the second end effector,
wherein the first end effector is configured to conform to a first radius associated with a rounded hat configuration of a hat stringer forming tool associated with the forming apparatus, and
wherein the second end effector is configured to conform to a second radius associated with the rounded hat configuration of the hat stringer forming tool.

17. The forming apparatus of claim 16 wherein the first end effector comprises a first forming feature and the second end effector comprises a second forming feature, and
wherein the first forming feature comprises a first forming finger and the second forming feature comprises a second forming finger.

18. The forming apparatus of claim 17 wherein the first forming finger is configured to conform to the first radius associated with the rounded hat configuration of the hat stringer forming tool, and
wherein the second forming finger is configured to conform to the second radius associated with the rounded hat configuration of the hat stringer forming tool.

19. The forming apparatus of claim 16 wherein the stomp foot is configured to conform to the rounded hat configuration of the hat stringer forming tool.

20. The forming apparatus of claim 19 wherein the stomp foot comprises a curved surface configured to match the rounded hat configuration of the hat stringer forming tool.

* * * * *